US008170466B2

(12) United States Patent
Tidwell-Scheuring et al.

(10) Patent No.: US 8,170,466 B2
(45) Date of Patent: May 1, 2012

(54) SYSTEM AND METHOD FOR AUTOMATED ASSESSMENT OF CONSTRAINED CONSTRUCTED RESPONSES

(75) Inventors: Sylvia Tidwell-Scheuring, Carmel, CA (US); Roger P. Creamer, Pacific Grove, CA (US); Molly Zebrowski, Converse, TX (US); David D. S. Poor, Meadowbrook, PA (US)

(73) Assignee: CTB/McGraw-Hill, Monterey, CA (US)

( * ) Notice: Subject to any disclaimer, the term of this patent is extended or adjusted under 35 U.S.C. 154(b) by 1498 days.

(21) Appl. No.: 11/441,450

(22) Filed: May 26, 2006

(65) Prior Publication Data
US 2006/0286539 A1 Dec. 21, 2006

Related U.S. Application Data

(60) Provisional application No. 60/685,082, filed on May 27, 2005.

(51) Int. Cl.
G09B 7/00 (2006.01)
(52) U.S. Cl. ......... 434/353; 434/350; 434/322; 434/359
(58) Field of Classification Search .......... 434/350, 434/353, 322, 363, 355
See application file for complete search history.

(56) References Cited

U.S. PATENT DOCUMENTS

| | | | |
|---|---|---|---|
| 5,059,127 A | 10/1991 | Lewis et al. | |
| 5,211,564 A * | 5/1993 | Martinez et al. | 434/323 |
| 5,321,611 A | 6/1994 | Clark et al. | |
| 5,433,615 A | 7/1995 | Clark | |
| 5,513,994 A | 5/1996 | Kershaw et al. | |
| 5,519,809 A | 5/1996 | Husseiny et al. | |
| 5,562,460 A | 10/1996 | Price | |
| 5,565,316 A | 10/1996 | Kershaw et al. | |
| 5,657,256 A | 8/1997 | Swanson et al. | |
| 5,727,951 A | 3/1998 | Ho et al. | |
| 5,779,486 A | 7/1998 | Ho et al. | |
| 5,823,789 A | 10/1998 | Jay et al. | |
| 5,827,070 A | 10/1998 | Kershaw et al. | |
| 5,870,731 A | 2/1999 | Trif et al. | |
| 5,879,165 A | 3/1999 | Brunkow et al. | |
| 5,890,911 A | 4/1999 | Griswold et al. | |
| 5,904,485 A | 5/1999 | Siefert | |
| 5,934,909 A | 8/1999 | Ho et al. | |

(Continued)

OTHER PUBLICATIONS

American Association for the Advancement of Science Literacy, "Laws of Motion", pp. 62-63, 2001.

(Continued)

Primary Examiner — Kang Hu
(74) Attorney, Agent, or Firm — Rothwell, Figg, Ernst & Manbeck PC

(57) ABSTRACT

A system and method for automated assessment of constrained constructed responses provides for automatic, e.g., programmatic, assessing of a test subject response to a constrained constructed response item or question. In one embodiment, paper test materials with test subject markings thereon are converted to electronic form. Test subject markings are further isolated, for example, by registration, sizing and removal of markings other than a graphic response. The subject markings are further compared with a baseline response, correctness deviation criteria and incorrectness deviation criteria (e.g., correctness, incorrectness, substantial correctness, substantial incorrectness, and so on) from which one or more of a score, further learning or other assessment results may be determined. Cluster analysis or other post-evaluation or post-assessment processing may also be conducted, or re-evaluation or re-assessment may also be conducted.

59 Claims, 14 Drawing Sheets

U.S. PATENT DOCUMENTS

| | | | |
|---|---|---|---|
| 5,934,910 A | 8/1999 | Ho et al. | |
| 5,947,747 A | 9/1999 | Walker et al. | |
| 5,954,516 A | 9/1999 | Heinberg | |
| 5,967,793 A | 10/1999 | Ho et al. | |
| 5,991,595 A | 11/1999 | Romano et al. | |
| 6,000,945 A | 12/1999 | Sanchez-Lazer et al. | |
| 6,018,617 A | 1/2000 | Sweitzer et al. | |
| 6,029,043 A | 2/2000 | Ho et al. | |
| 6,039,575 A | 3/2000 | L'Allier et al. | |
| 6,064,856 A | 5/2000 | Lee et al. | |
| 6,077,085 A | 6/2000 | Parry et al. | |
| 6,112,049 A | 8/2000 | Sonnenfeld | |
| 6,118,973 A | 9/2000 | Ho et al. | |
| 6,120,299 A | 9/2000 | Trenholm et al. | |
| 6,146,148 A | 11/2000 | Stuppy | |
| 6,148,174 A | 11/2000 | Remschel | |
| 6,149,441 A | 11/2000 | Pellegrino et al. | |
| 6,164,975 A | 12/2000 | Weingarden et al. | |
| 6,168,440 B1 | 1/2001 | Clark et al. | |
| 6,173,154 B1* | 1/2001 | Kucinski et al. | 434/359 |
| 6,186,794 B1 | 2/2001 | Brown et al. | |
| 6,186,795 B1 | 2/2001 | Wilson | |
| 6,212,358 B1 | 4/2001 | Ho et al. | |
| 6,234,806 B1 | 5/2001 | Trenholm et al. | |
| 6,259,890 B1 | 7/2001 | Driscoll et al. | |
| 6,285,993 B1 | 9/2001 | Ferrell | |
| 6,295,439 B1 | 9/2001 | Bejar et al. | |
| 6,301,571 B1 | 10/2001 | Tatsuoka | |
| 6,311,040 B1 | 10/2001 | Kucinski et al. | |
| 6,336,029 B1 | 1/2002 | Ho et al. | |
| 6,341,212 B1 | 1/2002 | Shende et al. | |
| 6,418,298 B1 | 7/2002 | Sonnenfeld | |
| 6,419,496 B1 | 7/2002 | Vaughan | |
| 6,431,875 B1 | 8/2002 | Elliott et al. | |
| 6,442,370 B1 | 8/2002 | Driscoll et al. | |
| 6,484,010 B1 | 11/2002 | Sheehan | |
| 6,526,258 B2 | 2/2003 | Bejar et al. | |
| 6,558,166 B1 | 5/2003 | Clark et al. | |
| 6,606,480 B1 | 8/2003 | L'Allier et al. | |
| 6,688,889 B2 | 2/2004 | Wallace et al. | |
| 6,704,741 B1 | 3/2004 | Lively, Jr. et al. | |
| 6,751,351 B2* | 6/2004 | Knowles et al. | 382/181 |
| 6,758,674 B2* | 7/2004 | Lee | 434/155 |
| 6,768,894 B2* | 7/2004 | Jongsma et al. | 434/353 |
| 6,772,081 B1 | 8/2004 | Gedlinske et al. | |
| 6,810,232 B2 | 10/2004 | Knowles et al. | |
| 6,816,702 B2 | 11/2004 | Kuntz et al. | |
| 6,978,115 B2 | 12/2005 | Whitehurst et al. | |
| 7,121,830 B1 | 10/2006 | Kaplan et al. | |
| 7,127,208 B2 | 10/2006 | Burstein et al. | |
| 7,137,821 B2 | 11/2006 | Jorgensen et al. | |
| 7,162,198 B2 | 1/2007 | Kuntz et al. | |
| 7,165,012 B2 | 1/2007 | Swanson | |
| 2002/0001795 A1 | 1/2002 | Bejar et al. | |
| 2002/0142278 A1* | 10/2002 | Whitehurst et al. | 434/350 |
| 2002/0182579 A1 | 12/2002 | Driscoll et al. | |
| 2002/0188583 A1 | 12/2002 | Rukavina et al. | |
| 2003/0017442 A1 | 1/2003 | Tudor et al. | |
| 2003/0129576 A1 | 7/2003 | Wood et al. | |
| 2003/0152902 A1 | 8/2003 | Altenhofen et al. | |
| 2003/0175677 A1 | 9/2003 | Kuntz et al. | |
| 2003/0180703 A1 | 9/2003 | Yates et al. | |
| 2003/0224340 A1* | 12/2003 | Housman et al. | 434/353 |
| 2004/0106088 A1 | 6/2004 | Driscoll et al. | |
| 2004/0221013 A1 | 11/2004 | Timbadia et al. | |
| 2004/0229199 A1 | 11/2004 | Ashley et al. | |
| 2004/0267500 A1 | 12/2004 | Gedlinske et al. | |
| 2005/0026130 A1 | 2/2005 | Crowhurst et al. | |
| 2005/0037326 A1 | 2/2005 | Kuntz et al. | |
| 2005/0095571 A1 | 5/2005 | Miller | |
| 2005/0153269 A1 | 7/2005 | Driscoll et al. | |

OTHER PUBLICATIONS

Bunderson et al., "The Four Generations of Computerized Educational Measurement", In Educational Measurement, 3$^{rd}$ Ed., pp. 387-398, 1989.

Gagné, R.M. Learning Hierarchies[3]: Chapter 2, pp. 63-84 (1968).

Gong, B., et al. "Instructional Assessments: Lever for Systemic Change in Science Education Classrooms", Journal of Science Education and Technology, vol. 1, No. 3, pp. 157-176, 1992.

Helm, L., Los Angeles Times, "The future of software may lie in the obscure theories of an 18th century cleric named Thomas Bayes", 4 pages, Oct. 28, 1996, http://www.cs.berkeley.edu/~murphyk/Bayes/la.times.html.

Henze, N., et al. "Student Modeling in an Active Learning Environment Using Bayesian Networks", Proceedings of the 7$^{th}$ International Conference on User Modeling, UM99 (Banff, CA, 1977) pp. 1-10.

Mioduser, David, et al., "The Weather Lab: An Instruction-Based Assessment Tool Built From a Knowledge-Based System", Journal of Computers in Mathematics and Science Teaching, vol. 17, No. 2/3, pp. 239-263, 1998.

Pellegrino, J.W., et al., "Knowing What Students Know: The Science and Design of Educational Assessment", The National Academies Press, pp. 175-186, 188-189, 200-206, Sep. 28, 2001.

STATESTANDARDS.COM, "California Star Standards Test Blueprints", (2003), 1 page, May 11, 2004.

* cited by examiner

E.g., using size, feature placement or alignment

Circle all the nouns in the paragraph below.

Once upon a (time) in a (land) far, far away there was a young (girl) named (Sylvia). (She) lives in a giant (castle) on the top of very large (hill). (Sylvia) had a little (squirrel) named (Jim.) One (day) a (man) in a black (mask) came by and said, ("Sylvia), I am your (brother)."

*FIG. 3B*

Circle all the nouns in the paragraph below.

~~Once upon~~ a time ~~in~~ a land ~~far, far away~~ ~~there was a young~~ girl ~~named~~ Sylvia. She ~~lives in a giant~~ castle ~~on the top of very large~~ hill. Sylvia ~~had a little~~ squirrel named Jim. ~~One~~ day a man ~~in a black~~ mask ~~came by and said~~, "Sylvia, ~~I am your~~ brother."

*FIG. 3C*

In the story below, John experiences, in order, braving rapids, Losing an Oar and then got wet while paddling down the river.

600a

|       | Column-A      | Column-B      |
|-------|---------------|---------------|
| 601   | Sub-Item 1a 2 | 1. Sub-Item 2b |
| 602   | Sub-Item 2a ≤ | 2. Sub-Item 1b |
| 603   | Sub-Item 3a ± | 3. Sub-Item 2b |
| 604   | Sub-Item 4a ⊃ | 4. Sub-Item 3b |
| 605   | Sub-Item 5a   | 5. Sub-Item 4  |

Once upon a time in a land far, far away

Sylvia there was a young girl named Sylvia. She lived lives in a giant castle on the top of very little squirrel large hill. Sylvia had a littel squirel named Jim. One day a man in a black She mask came by and said, "Sylvia, I am your brother."

*FIG. 6B*

SYSTEM AND METHOD FOR AUTOMATED ASSESSMENT OF CONSTRAINED CONSTRUCTED RESPONSES

This application claims the benefit of U.S. Provisional Application Ser. No. 60/685,082 filed May 27, 2005, the contents of which are hereby incorporated by reference.

BACKGROUND OF THE INVENTION

1. Field of Invention

The present invention relates in general to the field of education and more specifically to systems and methods for conducting test assessment.

2. Description of the Background Art

Mechanisms for creating and evaluating testing materials have remained largely unchanged for many decades. In conducting standardized testing, for example, test preparation experts of a test producer create a test as series of questions or test "items" and corresponding selectable test item responses. The items and an item response grid are then typeset, bound in a test booklet, and—close in time to actually conducting the testing—the booklets are delivered to schools or other test sites.

The test booklets are then distributed by the officiators to test proctors. Within each classroom or other test site location, a proctor distributes the test booklets, instructs the test subjects (e.g., students) respecting testing protocol, and initiates, times and proctors the testing. It is further presumed that the students read the items, select responses to the test items and fill-in the corresponding test response grid. The completed tests are then collected in each classroom, combined with those of other test site classrooms, combined with completed tests from other test sites, and then delivered to an assessment service provider—often the suppliers of the testing booklets. (Scratch paper is also often distributed for student calculations or other response determination, which scratch paper is collected, accounted for and discarded.)

Test assessment experts then individually grade each grid of each student. Because a grid of just a few detachable pages is used, the grading may be conducted by hand or by machine. The grids may, for example, be detached, scanned and a grid reader may identify, for each row, (response item) whether the correct grid column element is blackened. If so, then credit is given for a correct answer. If not, then no credit is given or credit may be deducted for an incorrect grid column item that is blackened.

Unfortunately, the above mechanism is extremely time consuming and laborious. For example, each test item must be manually created in a manner that is likely to be understood, sufficient for suitably testing a particular aspect of student knowledge and readily ordered and answered to that end. To make matters more difficult, more than one set of items may be needed to better assure fair and uncompromised testing. The collection and grading process may also take months to complete.

The above mechanism is also limited in scope and may prove to be an inaccurate assessor of student knowledge. For example, since testing other than selected answer (grid based) must be accomplished entirely by hand, testing is typically limited to selected answer type testing. The accuracy of such testing may further be compromised due to inherent ethnic or national bias, responses that may be difficult to identify, interpret or distinguish, or otherwise fail to assess an intended knowledge (or teaching) aspect. Hand grading is also subject to human perception inaccuracies or inconsistencies. Conventional assessment is also limited to determining a score and fails to consider identifying actual student (or instructor or institutional) knowledge, understanding or skill factors that may be used for bestowing partial credit or providing further learning, further evaluation or other potential benefits.

The present inventor has also identified particular problems relating to constrained constructed response item creation and assessment, such as with graphic, markup, multimedia or other responses, as well as other aspects of assessment and/or learning support. For example, the potential for subject error due to item misinterpretation, mis-calculation, infirmity influences, mis-execution and/or human error make it is extremely difficult to manually assess them in an accurate or consistent manner within a standard or otherwise acceptable margin of error. Current mechanisms also render infeasible the prospect of assessing other learning information other than raw score, among still further difficulties.

Accordingly, there is a need for automated constrained constructed response item assessment systems and methods that enable one or more of the above and/or other problems of conventional mechanisms to be avoided.

SUMMARY OF EMBODIMENTS OF THE INVENTION

Embodiments of the present invention provide systems and methods for conducting paper-based or electronic assessment of graphic, matching, markup, short answer and/or other constrained constructed response CCR item responses, thereby enabling problems of conventional mechanisms to be avoided and/or further advantages to be achieved. Such assessment may, for example be conducted in conjunction with one or more of formative, summative or other testing, educational or other gaming, homework, assessable business or other life occurrences, other interactions, and so on. The assessment may also include one or more of a achievement and/or performance assessment (e.g., scored with numeric or performance level descriptor, which is hereafter referred to as performance assessment), a learning assessment (e.g., diagnosis, knowledge, understanding, further materials/training, discussion, and so on) or other assessments that may be desirable. One or more of such assessments may further assess an item response of a correct or incorrect type which may, for example, be determined in accordance with predetermined static or modifiable operational parameters or assessment criteria.

Various embodiments provide for conducting such assessing, or further, for creating assessment items, in an automatic, user-assisted or combined manner that may include one or more of absolute or evaluative scoring, student knowledge/application characteristic assessment, learning process/educator assessment, and further learning planning or other learning assessment. Evaluative assessment may, for example, include but is not limited to a substantiality-of-responsiveness based approach in which one or more categorizations or sub-categorizations of absolutely, substantially or detectably correct, incorrect, other or mixed criteria may be used for assessing one or more learning characteristics. Assessment may further be conducted using a variety of item response portions, for example, including but not limited to an assessment answer sheet portion (e.g., where a separate question book and answer sheet are used) or a mixed format portion including at least one assessment item and a response region for receiving an assessment subject's corresponding item response.

In one embodiment, a CCR assessor comprises coupled components including a CCR response analyzer, a CCR assessment engine and an assessment action/log engine. The CCR response analyzer provides for receiving and providing to the CCR assessment engine assessment criteria according to which a CCR item may be analyzed, and operational parameters according to which assessment parameters may be applied and/or an evaluation may be interpreted or otherwise utilized. The operational parameters and/or assessment parameters may, for example, correspond to an entire assessment or some portion thereof (e.g., one or more of CCR item type, CCR item, assessment portion, assessment portion goals, initial assessment cycle, recursive assessment cycle, and so on). The response analyzer further provides for receiving a scanned or electronically provided CCR item response portion, and for registering, resizing and/or isolating responsive markings comprising a CCR item response in whole or part as needed, for example, according to a CCR item type and/or other parameters/criteria. The CCR assessment engine compares the responsive markings with absolute/substantial deviation criteria and determines therefrom one or more evaluation indicators. The evaluation indicators may, for example, include one or more of correctness, substantiality/type of correctness, substantiality/type of incorrectness, other determinable incorrectness indicators, which indicators may be assessed by the action/logging engine to produce a score, other performance assessment(s), a learning assessment, and so on. The evaluation indicators may also include one or more indicators indicating that the CCR item response could not be evaluated in whole or part, in which case the action/logging engine may alert an assessment system user.

A CCR assessment method according to an embodiment of the invention includes receiving an item response portion corresponding to an assessment item, the item response portion having a response region and the assessment item having an associated CCR item response type. The method also includes isolating, at least in part, assessment-subject markings ("responsive markings") within a super-response region corresponding to the response region. The method further includes comparing the responsive markings to absolute correctness and deviation assessment criteria, and determining therefrom evaluation indicators indicating at least one of correctness, substantiality of correctness, incorrectness and substantiality of incorrectness of the responsive markings. The comparing and determining may, in various embodiments, correspond with the CCR item response type, or may further include other item response types. For example, responsive markings for an assessment item that is associated with a response type including a graph may be compared with graph assessment criteria only, or may further be compared with other CCR or other item response types. The method further includes determining at least one of performance assessment and learning assessment parameters corresponding to the evaluation indicators.

Another CCR assessment method further includes determining, from the evaluation indicators of one or more items, at least one of actual/likely deficiencies and actual/likely learning to correct for one or more determined (substantial) deficiencies. The method may, for example, include determining a relationship of one or more (substantial) deficiencies to a learning map or other diagnostic criteria.

In other CCR assessment method embodiments, a recursive assessment may further be conducted in which at least one of the evaluation indicators and the assessment parameters are compared. One more specific embodiment, for example, provides for comparing the evaluation indicators of a same assessment subject, and for determining therefrom clusters of errors of a same type, for example, in order to identify more and/or less frequently occurring knowledge or execution errors (e.g., understanding items, performing requested tasks, drawing, and so on). Another more specific embodiment provides for associating, with at least one of the deviation criteria or one or more sub-types or groups thereof, a deviation type indicator of a definite type (if predetermined) or an indefinite type (if not predetermined). The embodiment further includes comparing the evaluation indicators of different assessment subjects, and for determining therefrom clusters of errors of a same type. One more specific embodiment provides for evaluating one or more items or item appropriateness corresponding thereto according to a size of one or more determined clusters of a same or similar type. The embodiment further provides for conducting re-grading or ignoring one or more of the items. Another more specific embodiment provides for comparing cluster sizes and for determining optimal forms of selected response items (or other item types) that target sub-populations of students for ability, diagnostics or both, among other embodiments.

A further assessment system according to an embodiment of the invention includes a machine-readable medium storing program code for causing a computer to perform the steps of receiving an item response portion corresponding to an assessment item, the item response portion having a response region and the assessment item having an associated CCR item response type; isolating, at least in part, assessment-subject markings ("responsive markings"), if any, of substantial importance within a super-response region corresponding to the response region; comparing the responsive markings to absolute correctness and deviation assessment criteria; determining therefrom evaluation indicators indicating at least one of correctness, substantiality of correctness, incorrectness and substantiality of incorrectness of the responsive markings. The comparing and determining may, in various embodiments, correspond with the CCR item response type, or may further include other item response types. For example, responsive markings for an assessment item that is associated with a response type including a graph may be compared with graph assessment criteria only, or may further be compared with other CCR or other item response types. The method further includes determining at least one of performance assessment and learning assessment parameters corresponding to the evaluation indicators.

Advantageously, CCR assessment embodiments according to the invention enable CCR items to be created and/or assessed in an efficient, robust, objective and reliable manner that may be conducted automatically. Among other advantages, embodiments further enable correctness, incorrectness and/or other deviations from an idealized or exemplary CCR response to be considered for assessing an absolute or substantially correct or incorrect response that may be utilized, in a further verifiable manner, for grading, learning planning and/or other purposes.

These provisions together with the various ancillary provisions and features which will become apparent to those artisans possessing skill in the art as the following description proceeds are attained by devices, assemblies, systems and methods of embodiments of the present invention, various embodiments thereof being shown with reference to the accompanying drawings, by way of example only, wherein:

BRIEF DESCRIPTION OF THE DRAWINGS

FIG. 3b illustrates application of deviation criteria in conjunction with evaluation or assessment of a markup CCR item response, according to an embodiment of the invention;

FIG. 3c illustrates application of deviation criteria in conjunction with evaluation or assessment of a further markup CCR item response, according to an embodiment of the invention;

FIG. 6a illustrates application of deviation criteria in conjunction with evaluation or assessment of a crossover or mixed CCR item response, according to an embodiment of the invention;

FIG. 6b illustrates application of deviation criteria in conjunction with evaluation or assessment of a further crossover or mixed CCR item response, or further in conjunction with cluster analysis, re-evaluation or re-assessment, according to an embodiment of the invention;

DETAILED DESCRIPTION OF EMBODIMENTS OF THE INVENTION

Figure 1A:
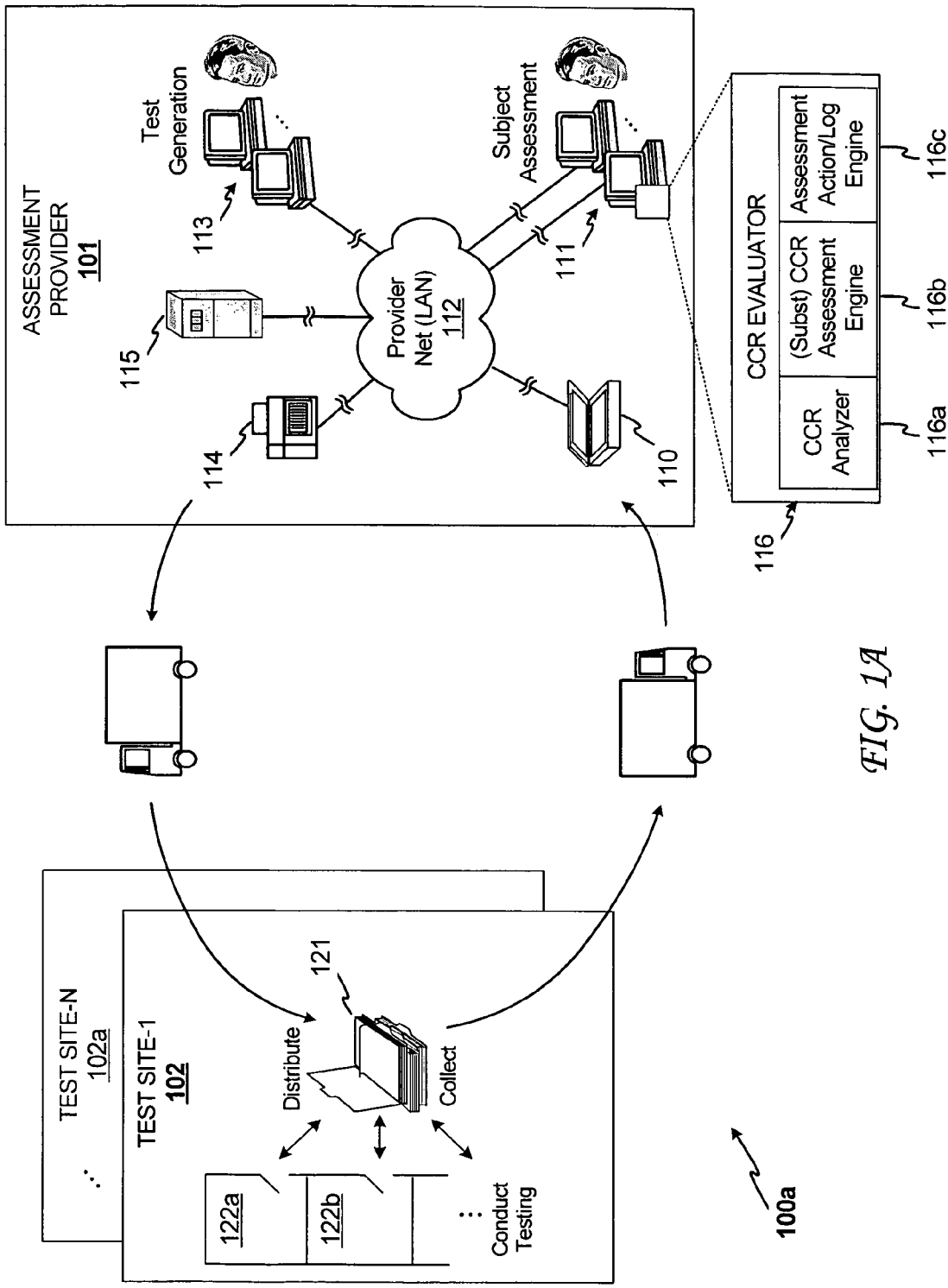
FIG. 1a is a flow diagram illustrating a automated constrained constructed response ("CCR") assessment system according to an embodiment of the invention.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

A "computer" for purposes of embodiments of the present invention may include any processor-containing device, such as a mainframe computer, personal computer, laptop, notebook, microcomputer, server, personal data manager or "PIM" (also referred to as a personal information manager or "PIM") smart cellular or other phone, so-called smart card, settop box or any of the like. A "computer program" may include any suitable locally or remotely executable program or sequence of coded instructions which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for synchronously presenting multiple video program ID streams, such as on a display screen of the computer, the computer would have suitable instructions (e.g., source code) for allowing a user to synchronously display multiple video program ID streams in accordance with the embodiments of the present invention. Similarly, if a computer is employed for presenting other media via a suitable directly or indirectly coupled input/output (I/O) device, the computer would have suitable instructions for allowing a user to input or output (e.g., present) program code and/or data information respectively in accordance with the embodiments of the present invention.

A "computer-readable medium" for purposes of embodiments of the present invention may be any medium that can contain, store, communicate, propagate, or transport the computer program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. The computer readable medium may have suitable instructions for synchronously presenting multiple video program ID streams, such as on a display screen, or for providing for input or presenting in accordance with various embodiments of the present invention.

Referring now to FIG. 1a, there is seen a flow diagram illustrating a constrained constructed response ("CCR") assessing system 100a according to an embodiment of the invention. CCR assessing system ("assessing system") 100a broadly provides for assessing one or more graphs, markups, matching, short answer or other constrained constructed responses ("CCRs") that correspond to questions or other items that may be included in an assessment and subject to a response from an assessment subject (hereinafter "student"). An assessment may, for example, include one or more of formative, summative or other testing, educational or other gaming, homework or other assigned or assumed tasks, assessable business or other life occurrences, other interactions, and so on. An assessment may also include a performance assessment (e.g., scored), a learning assessment (e.g., knowledge, understanding, further materials/training, discussion, and so on), other assessments that may be desirable, or some combination thereof.

For clarity sake, however, the more specific assessment example of testing will be used as a consistent example according to which testing (or other assessment) embodiments of the invention may be better understood. It will be appreciated, however, that other assessment mechanisms may be utilized in a substantially similar manner as with testing.

In testing, for example, assessment materials (hereinafter, "testing materials") that may include one or more questions, other response requests or portions thereof ("items") is presented to a student who is charged with producing responses to the items ("item responses"). The items may, for example, charge the student with producing or modifying a presented graph or a portion thereof ("graph item") to produce a corresponding response ("graph item response"), circling, crossing out, annotating connecting, erasing, modifying or otherwise marking up portions of a presented drawing, text, audio/visual clip(s), other multimedia or combined test materials ("markup item") to produce a corresponding response ("markup item response"), delineating a correspondence ("matching item response") between or among presented images, text, other multimedia or combined test materials ("matching item"), producing missing text, numbers or other information or some combination ("short answer response") for completing a phrase, providing an answer, and so on, or some combination to presented test materials ("short answer item"), and so on. These and other responses or combinations thereof provide for constraining student responses in which the student is to add constructed material or CCR. (It will be appreciated, however, that student responses to other interactions may also include responses that may more directly comprise CCR portions or that may be subject to assessment in a similar manner.)

Note that the term "or" as used herein is intended to include "and/or" unless otherwise indicated or unless the context clearly dictates otherwise. The term "portion" as used herein is further intended to include "in whole or contiguous or non-contiguous part" which part can include zero or more portion members, unless otherwise indicated or unless the context clearly dictates otherwise. The term "multiple" as used herein is intended to include "two or more" unless otherwise indicated or the context clearly indicates otherwise.

The term "multimedia" as used herein may include one or more media types unless otherwise indicated or the context clearly indicates otherwise.

In a more specific embodiment, one or more hard copy (e.g., paper) testing materials may be received by a test site 102 and testing may be administered at one or more locations 102a, 102b within test site 102 to one or more test subjects (hereinafter "students"), which are not shown. The testing materials may, for example, be received from an assessment provider that will assess student responses 101, another assessment provider (not shown) or some combination. One or more versions of the test materials may be delivered to the test site in an otherwise conventional manner and test materials for each student may, for example, include at least one test booklet and at least one answer sheet. Alternatively, a mixed format may be used in which each student is provided with testing materials including an item sheet onto which a student is charged with providing item responses in a space provided or predetermined to be discoverable by the student ("response region"), or other formats or combined formats may be used. (Discovering a response region may also comprise an item response.)

Testing may be administered in an otherwise conventional manner at various locations 122a, 122b within each test site 102, 102a using the received test materials 121. The test materials may, however, include at least one CCR item for which one or more students are charged with providing a CCR response. (The test materials may also include more conventional items, for example, selected response items for which students are charged with selecting responses, e.g., using an answer grid, and so on.) Testing materials including student responses (hereinafter collectively "student answer sheets") may then be collected and delivered to subject assessment system 115 of assessment provider 101 for assessment. Other testing materials provided to students, including but not limited to test booklets, scratch paper, and so on, or some combination, may also be collected, for example, in an associated manner with a corresponding student answer sheet, or further delivered to subject assessment system 115, and may also be assessed. (Student markings that may exist on such materials or the lack thereof may, for example, be included in an assessment.)

Assessment provider 101 portion of assessment system 100 in one embodiment comprises a subject assessment system 111 including at least one test material receiving device 110 and a graphic response evaluator 116. Test material receiving device 110 in a more specific embodiment includes a high-speed scanner, braille reader or other mechanism for receiving one or more response portions (e.g., of an answer book) and providing included item responses in an electronic format to other subject assessment system components. Subject assessment system 111 also includes a CCR evaluator 116. CCR evaluator 116 provides for assessing one or more CCR item responses included in the electronically formatted test materials. Assessment provider 101 portion of assessment system 100 may further include a test generation system 113 and a printer, other rendering or other device(s) for providing test materials in a suitable form for delivery to a test site. Such components may further be at least intermittently communicatingly couplable via a suitable fixed or re-configurable network 112 for transferring information therebetween or to other locations (see, for example, FIG. 1b), and may include one or more servers 115.

CCR evaluator 116 in one embodiment further receives, from test generation system 113, another test generation source (not shown) or some combination, one or more assessment indicators indicating predetermined response evaluation criteria ("evaluation criteria"). CCR evaluator may also receive (e.g., from one or more of storage which is not shown, other assessment provider components, other assessment providers, government or other authorities, and so on) operational parameters which may determine or modify utilization of operational parameters, normalization, modification or other processing to be conducted, selection of learning maps or other diagnostic information to be utilized, recursive operation, other operation or other operational constraints, or some combination.

The evaluation criteria may, for example, include response format criteria corresponding to one or more CCR items or responses. The response format criteria may, for example, include but is not limited to registration/size indicators, identification information, such as for page registration marks 121 of FIG. 1c, which may be used to register a received response page 122 to evaluation registration position 123, item border identification, and so on, or for a response comprising only student markings, charged graph axes/angles, and so on. Sizing indicators may, for example, include indicators for reversing a size increase (e.g., to accommodate sight impaired students) or other mechanisms, or some combination of mechanisms may also be used in accordance with the requirements of a particular implementation.

The response format criteria may also include, for at least a current item, response region criteria for defining a region within which or corresponding to which a student is charged with providing a response portion or is otherwise expected to provide a response portion (e.g., the student's determination of which may also be assessed). The response format criteria may also include response super-region criteria (typically corresponding to a particular item) for defining a response super-region within which or corresponding to which an item response may nevertheless be found.

Figure 1B:
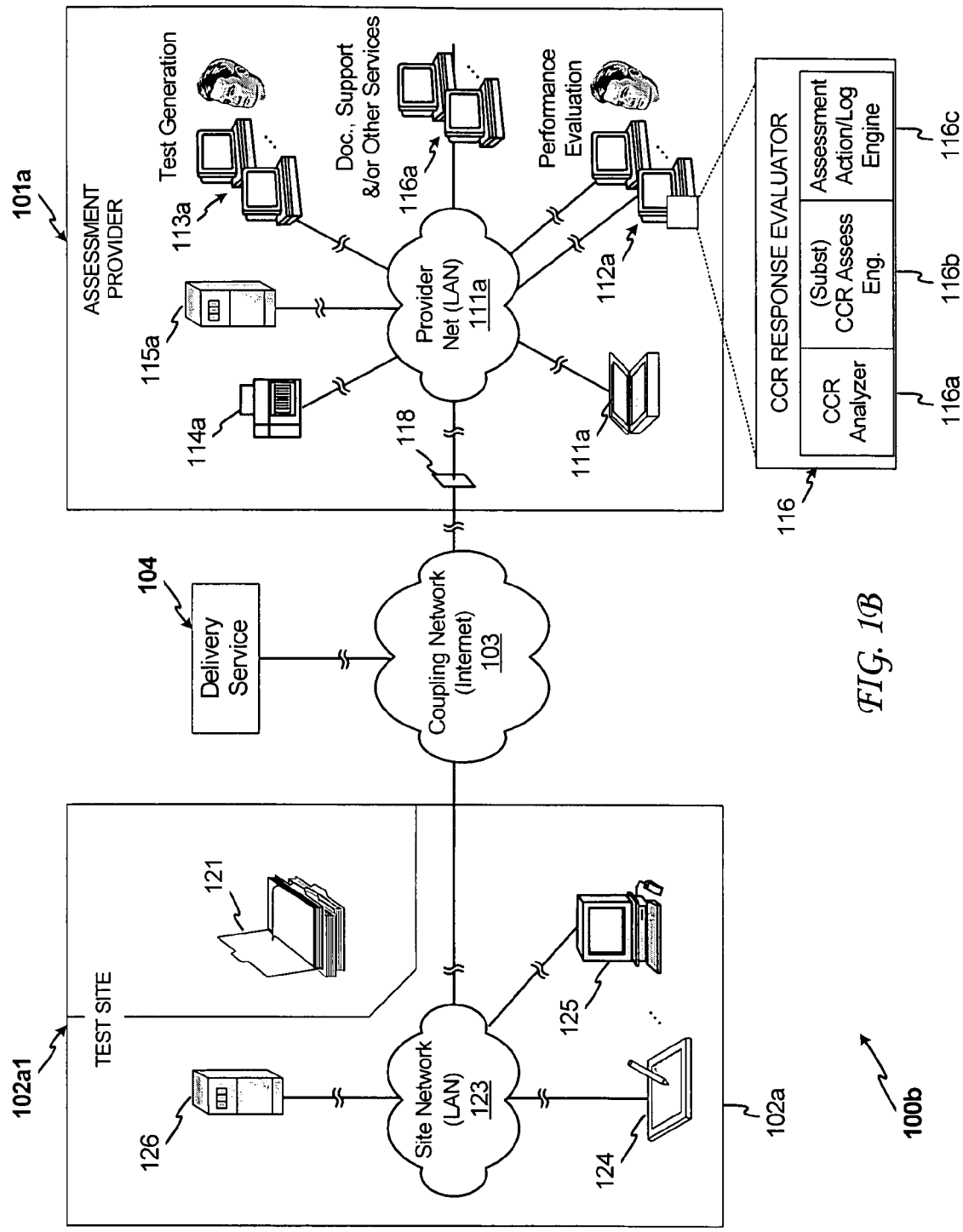
FIG. 1b is a flow diagram illustrating a further automated CCR assessment system according to an embodiment of the invention.
Figure 1C:
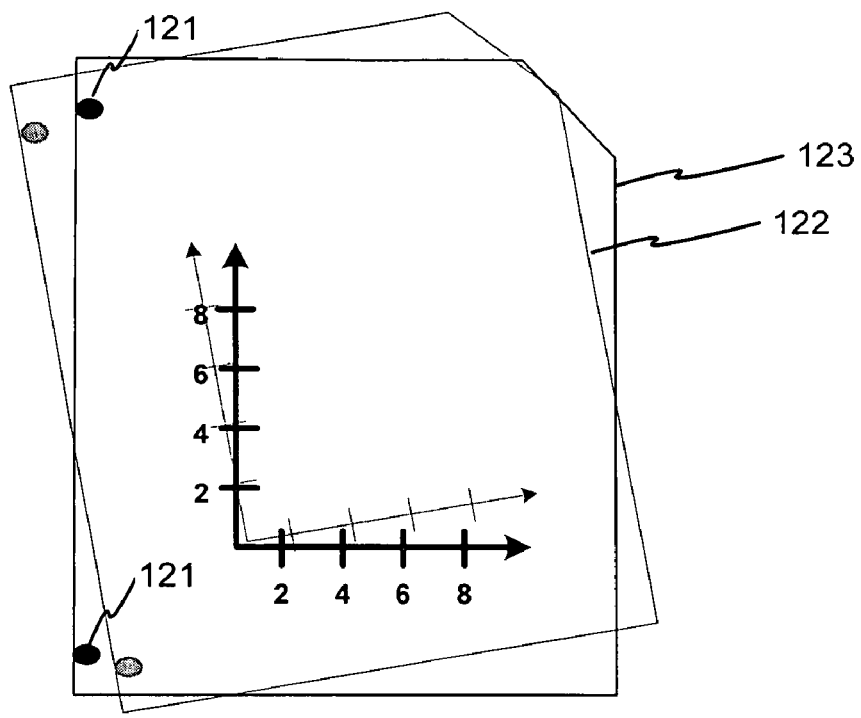
FIG. 1c illustrates a registration of a CCR response, in accordance with an embodiment of the invention.
Figure 1D:
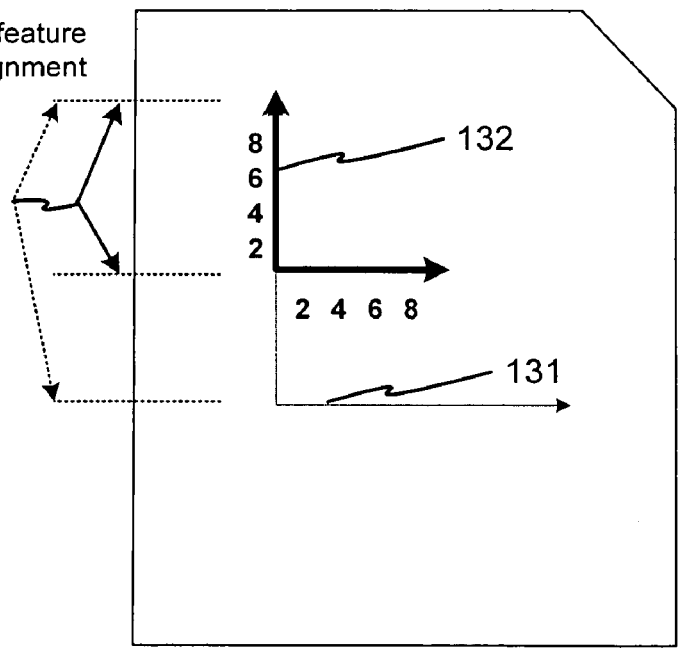
FIG. 1d illustrates sizing of a CCR responses, in accordance with an embodiment of the invention.
Figure 1E:
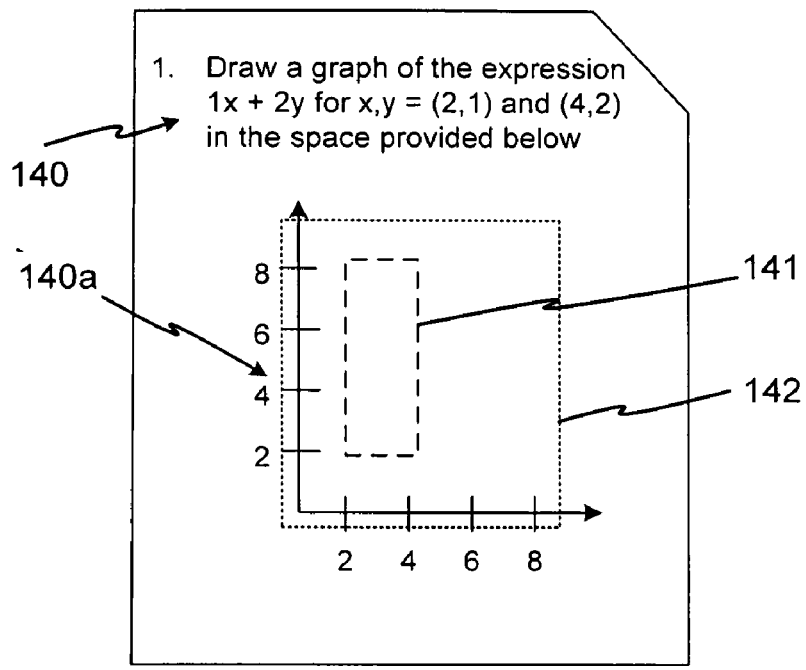
FIG. 1e illustrates utilization of a response region and a response super-region according to an embodiment of the invention.

In the mixed format test materials of FIG. 1e, for example, graph item 140 charges that a graph response should be drawn by a student in the area defined by the provided graph elements 140a. The format criteria corresponding to graph item 140 may therefore provide for CCR evaluator 116 (FIG. 1a) determining a response region 141 that corresponds with a charged correct response. The format criteria may further provide super-region criteria for determining a response super-region 142 that may, for example, correspond with allowable errors to which one or more students may be expected to be susceptible. It will be appreciated that the super-response region may also be substantially the same or otherwise correspond with a response region. In other embodiments, the super-response region may be variable, for example, in conjunction with various CCR item or sub-item portions, a re-grade or a recursive assessment (e.g., responsive to a discovered unexpected cluster corresponding to a large number of students assessed as failing to provide a response or sufficiently correct response within a response super-region).

Response format criteria may also include localizing refinement indicators, including but not limited to graph response indices, origins or any level indicators that form an assessment-provided or expected student-provided graphic item portion (e.g., see FIGS. 2a through 2f), graphic, textural, syntax, grammar, or other multimedia localizing, finding, organization, detectable aspect or other markup, matching or other CCR student marking detection facilitating parameters (e.g., see FIGS. 3a-4f), and so on, as may be applicable to a response type charged by an item portion provided for assessment.

Figure 1F:
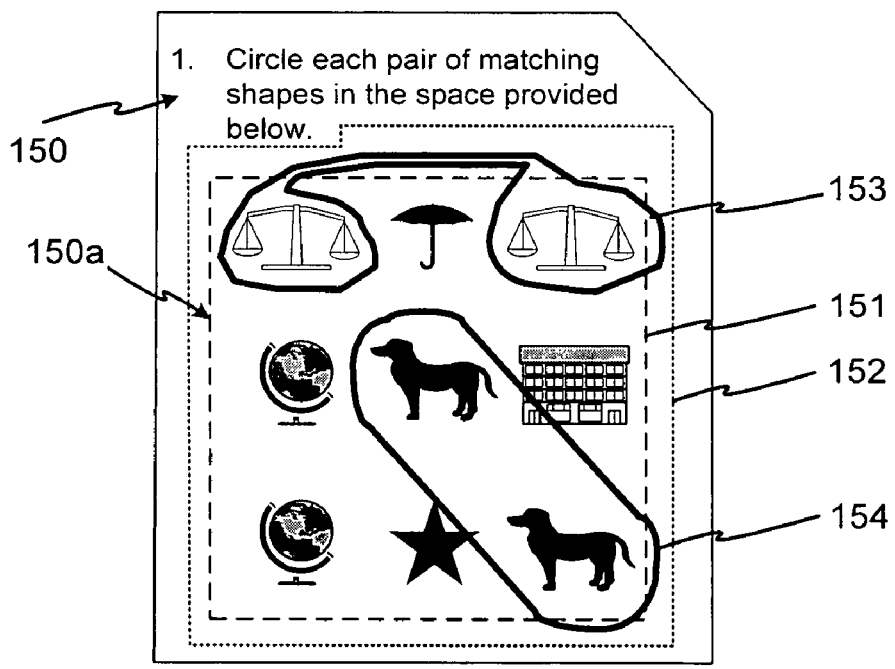
FIG. 1f illustrates further utilization of a response region and a response super-region according to an embodiment of the invention.

The evaluation criteria may also include isolating criteria for isolating a CCR item portion or CCR response portion within a corresponding response region or response super-region as needed for conducting assessment. In FIG. 1f, for example, a response region 150a may be determined according to format criteria corresponding to CCR item 150 as corresponding with the illustrated response region 150a. A response super-region 151 is further specified by format criteria within which evaluation may be conducted. Response super-region 151 may, for example, provide for the detection or assessment of markup response circles that (it is anticipated) may extend beyond response region 151, or student markings 153 that may circle the depicted scales without intersecting or also circling the depicted umbrella. Isolating criteria may also be provided, for example, to separately or concurrently remove the depicted building or star sub-items in conjunction with conducting detection or assessment of response 150a or at least in conjunction with detecting or assessing a charged circling of the depicted dog sub-items, e.g., as with student marking 154. Isolating criteria may further provide for identifying and removing the depicted scale or umbrella sub-items (e.g., via exclusive-or, redrawing or other mechanisms applicable to the known positions and content of the items) during at least detection or assessment of a responsive circling of the scales (e.g., by detecting a circle encompassing the scales in whole or part), for example, in conjunction with substantial correctness or incorrectness based assessment, as is discussed in greater detail below.

Figure 1G:
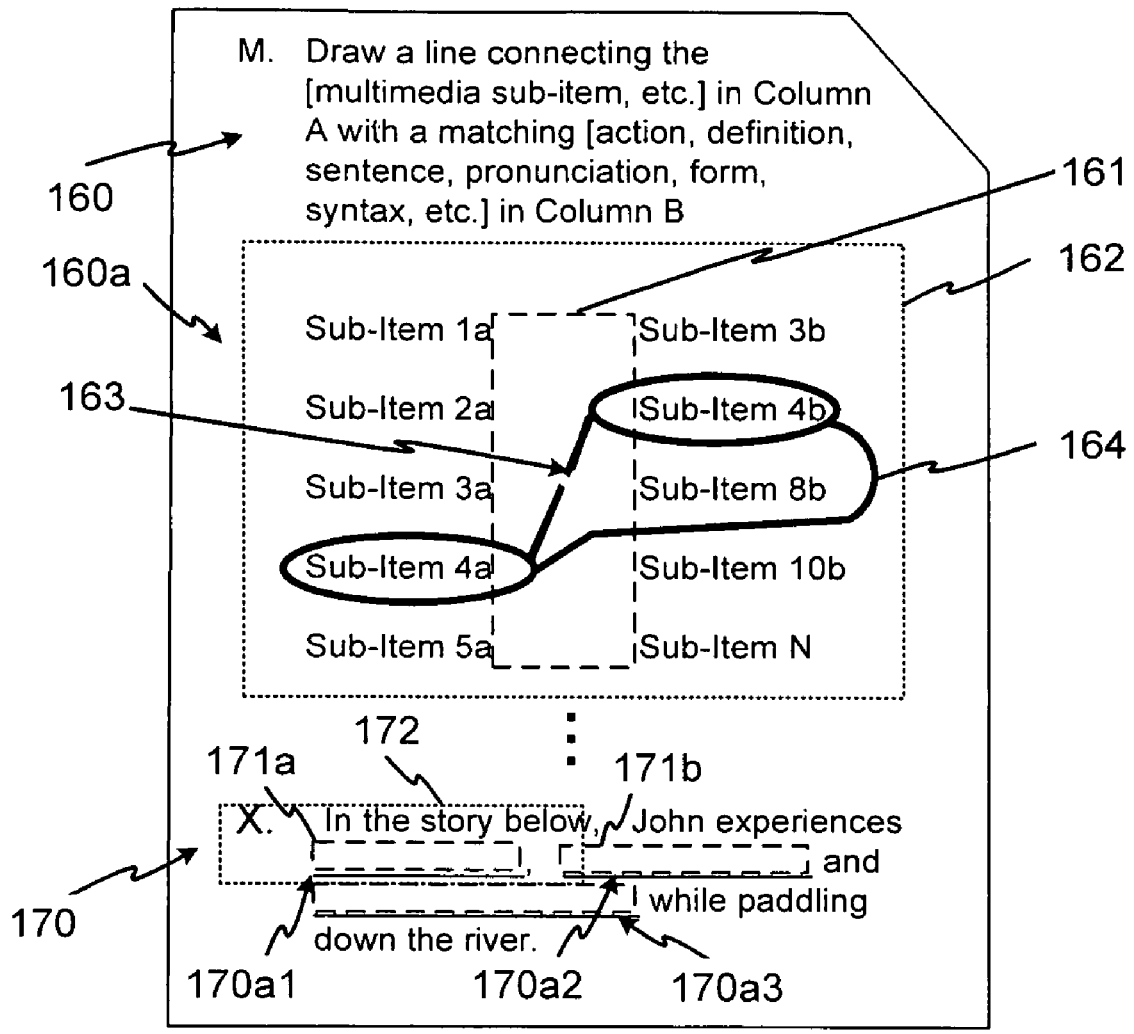
FIG. 1g illustrates still further utilization of a response region and a response super-region according to an embodiment of the invention.

In the further mixed format, multiple CCR item example of FIG. 1g, the matching item response 160a corresponding to matching item 160 is associated with format parameters defining response region 161. A response super-region 162 may, however, be further associated with item 160 to facilitate capturing or assessment of one or more attempted responses, for example, that may use circling of sub-items extending beyond the response region 163, 164, connectors within the response region that may otherwise appear incomplete (e.g., due to discontinuity) or indefinite (e.g., since student provided connector 163, may appear to connect sub-item 4a with sub-item 3b or sub-item 4b if the included circling is not considered). Response super-region 162 may also be determined in conjunction with format criteria, for example, for detecting a student marking such as 164, which may be detected as a correct or substantially correct response that merely extends outside response region 161 in an expectable manner (or which may become evident via a variably definable response region or super-region or via a cluster, recursive assessment or other post evaluation processing.

In the further multiple short answer item example at the lower portion of FIG. 1g, more than one or "multiple" short answer responses 170a1 through 170a3 correspond with short answer item 170. In this example, one or more super-response regions (e.g., 172 may be determined that extend beyond corresponding response regions (e.g., 171a, 171b), and may overlap other regions or sub-regions ("overlapping response super-regions"). Such super-regions may, for example, be defined by format criteria corresponding to item X 170 to facilitate detection or assessment of responses that may be expected to include greater amounts or sizes of textural responses. Isolating criteria may further provide for facilitating isolation of such text by identifying for removal one or more known, i.e., or "predetermined", item 170 portions (e.g., "In the story below", the line provided for response 170a1 in conjunction with the detecting or assessment of response 170a1 in accordance with response super-region 172. One or more of response super-region 172 or other response super-regions may also be defined or otherwise utilized as variable response super-regions as needed, for example, by modifying the size, position, and so on of a corresponding region in conjunction with re-grading, cluster detection, a student marking from which a need for such modification may be determined, and so on. One or more further item portions (e.g. ", John experiences . . .") may also be removed as needed or pattern recognition or other known or emerging AI tools or other techniques may also be used to remove an actually or potentially obstructing other response portion (e.g., 170a2) at least in conjunction with detecting or assessing a current one (e.g., 170a1), and so on. Other mechanisms or some combination of mechanisms may also be used in accordance with the requirements of a particular implementation.

Assessment criteria may further evaluation criteria. Utilization of evaluation criteria (as with other criteria or indicators) may be limited, for example, via operational parameters, to a current item or item type, or may also correspond with one or more other item types that may be utilized for performance assessment, learning assessment, other assessment or some combination thereof. More specifically, one embodiment provides for transferring to an assessment system analyzer only those evaluation (or selectable other) criteria that corresponds to a current CCR item or item type. Another embodiment provides a greater degree of flexibility by enabling other evaluation criteria to be provided to an assessment analyzer that may be used in conjunction with various initial or recursive assessments, or may further provide operational parameters indicating one or more assessments with which evaluation criteria is to be applied, or still further, the manner of application.

Using assessment criteria including correct, substantially correct, substantially incorrect, incorrect or undetermined evaluation criteria classifications or further sub-classifications that may be associated therewith, for example, operational parameters may be used to specify application of only correct or substantially correct responses (or one or more sub-categories thereof) to performance assessment, while some greater evaluation criteria portion (e.g., all evaluation criteria types and sub-types) to learning assessment, and so on. Operational parameters or other mechanisms may also be used to determine one or more of scoring or scoring ranges for particular evaluation types or sub-types, scoring or scoring ranges for an accumulation of evaluation types or subtypes, multiple scoring of the same or different assessment types using the same or different criteria, and so on. The manner of application may also include, for example, one or more of determining expected/unexpected clusters (e.g., according to static or variable evaluation criteria type/sub-type), determining from identified clusters whether consistent scoring or other assessment has been conducted, whether modification of assessment criteria or operational parameters or re-assessment should be conducted, or further, implementing such modification or re-assessment, one or more of which may be conducted in an automatic (e.g., programmatic), manual, user-assisted or combined (e.g., redundant) manner.

In one more specific embodiment, cluster analysis may also be used to assess the validity, reliability or defensibility of one or more related or unrelated test items. For example, a generated assessment may be administered to a sample group of students prior to operational use of the assessment. Cluster analysis may, for example, be conducted respecting student responses and the evaluation criteria, operational parameters, item portions and so on, or some combination may be correspondingly modified. A resulting modified assessment may then be operationally administered (or further non-operationally and then operationally administered), among other alternatives.

Such clustering (e.g., including any modification or re-assessment that may be conducted) may also be applied for identifying individual or combined student error or evaluation criteria type repetition (e.g., repeated deviation from instructions, reversing letters/numbers or other multimedia elements, and so on), among other operational parameters that may be desirable in conjunction with one or more particular assessment types, among others. Some combination may also be used.

Learning criteria may, for example, be used for assessing deviations in a student's CCR item response from an exemplary CCR item response, or further, for assessing learning deficiencies (e.g., including performance deficiencies) or further learning that may be provided to a student, among other purposes. (It will be appreciated that indicators or criteria may be provided in various manners, including but not limited to points, deviations, percentages, graphic or other multimedia indicators, and so on, or some combination thereof, in accordance with the requirements of a particular implementation.

Exemplary learning criteria in one embodiment include an idealized or other exemplary CCR that may be compared with a CCR portion provided by a student, whereby a correspondence of the exemplary and student responses may indicate a correct answer or various correct answer portions, while a lack of correspondence may indicate an incorrect answer A single correctness criteria may be provided corresponding to a single response item, or multiple correctness criteria (or sub-criteria) may be provided, for example, to assess various aspects of a CCR response, item sub or multiple responses, instruction following or assessment-taking skills, alternative correct responses, and so on or some combination thereof.

Deviations from an expected correct response may also be subject to performance, learning or other assessment. Such deviation may, for example, assess correctness, incorrectness, substantiality of correctness or incorrectness, and so on, or may identify or flag CCR responses that may remain undefined by an assessment system. In one embodiment, for example, one or more exemplary response indicators ("base response indicators") may also indicate a CCR basis from which substantially correct or incorrect student response aspect deviation may be determined by subject assessment system 112. Standard or other allowable deviation may, for example, be predetermined, modifiable via learning criteria or "learned" by system 112 according to other response assessment conducted with respect to the same or different users (e.g., using AI or recursive assessment), and so on, or some combination. Such deviation may further correspond in more specific embodiments with various deviation learning criteria or sub-categories thereof, or may correspond with a response super-region or some more stringent criteria, sub-categories, region, super-region, and so on, or some combination, may be applied, in accordance with particular item types, sub-types or other requirements of a particular implementation.

Figure 2A:
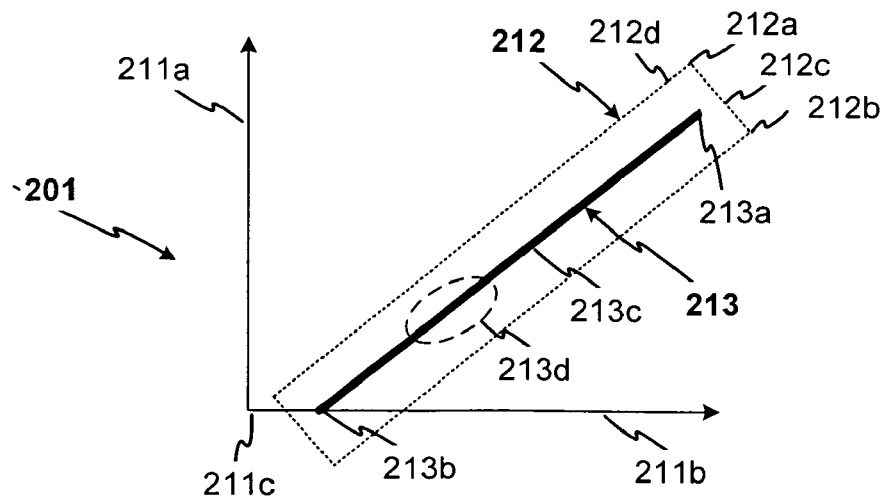
FIG. 2a is a graph illustrating automated graph creation and evaluation that may be conducted by the systems of FIG. 1a or 1b in conjunction with automated CCR assessment, according to an embodiment of the invention.
Figure 2B:
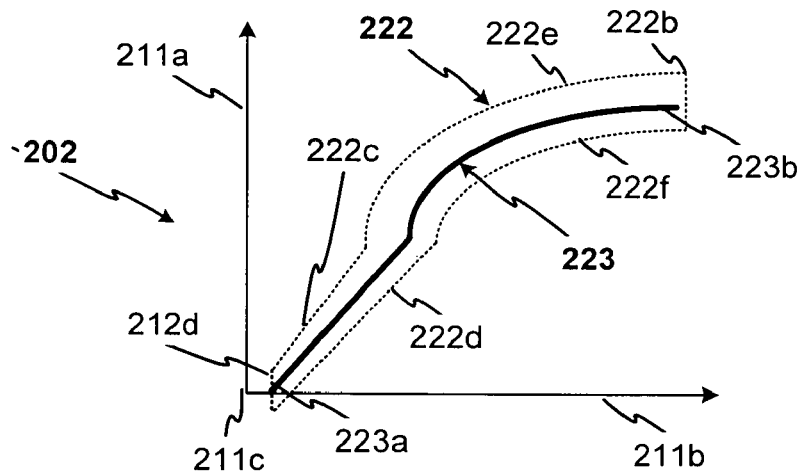
FIG. 2b is a graph illustrating further automated graph creation and evaluation that may be conducted by the systems of FIG. 1a or 1b in conjunction with automated CCR assessment, according to an embodiment of the invention.
Figure 2C:
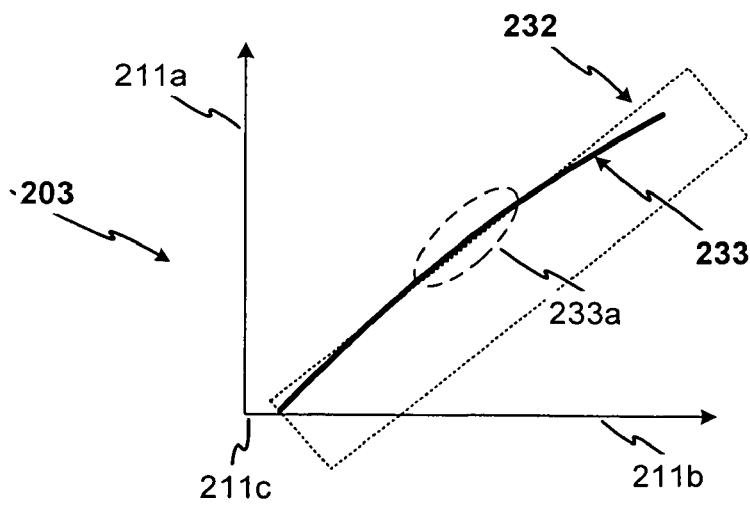
FIG. 2c is a graph illustrating further automated graph creation and evaluation that may be conducted by the systems of FIG. 1a or 1b in conjunction with automated CCR assessment, according to an embodiment of the invention.
Figure 3A:
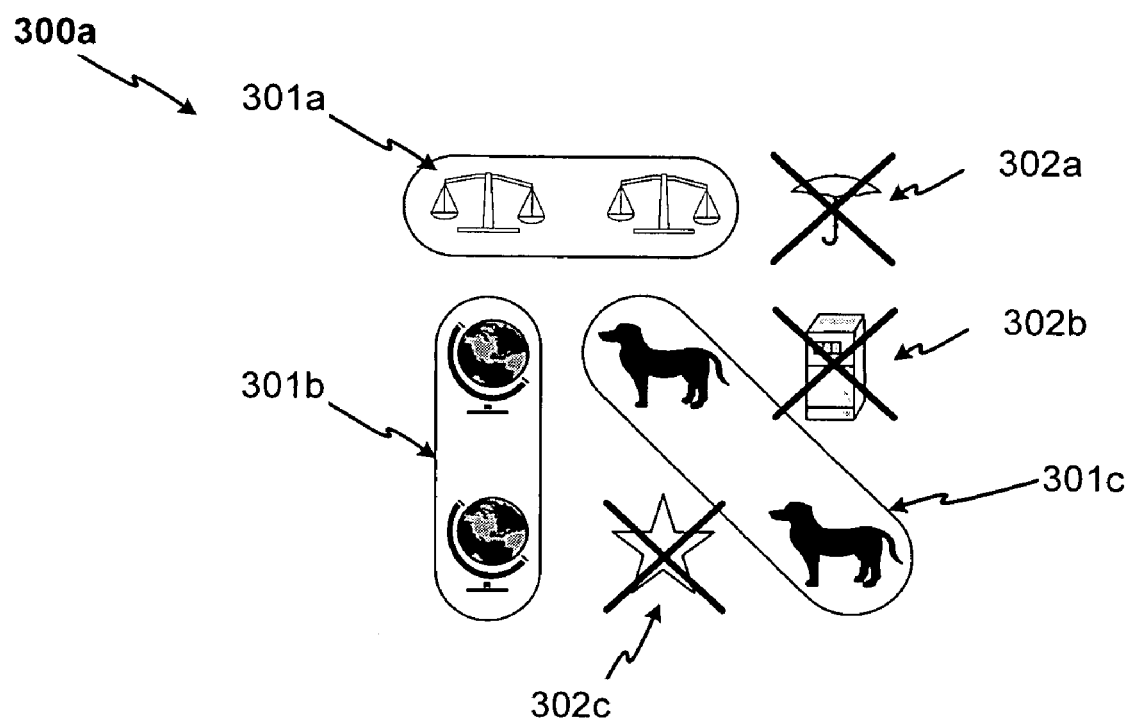
FIG. 3a illustrates application of deviation criteria in conjunction with evaluation or assessment of a markup CCR item response, according to an embodiment of the invention.
Figures 4, 5:
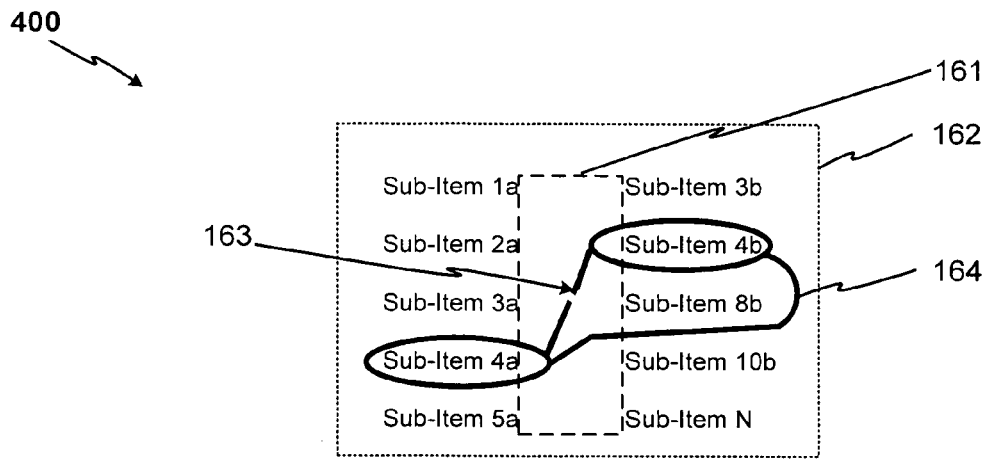
FIG. 4 illustrates application of deviation criteria in conjunction with evaluation or assessment of a matching CCR item response, according to an embodiment of the invention.
FIG. 5 illustrates application of deviation criteria in conjunction with evaluation or assessment of a short response CCR item response, according to an embodiment of the invention.

Exemplary base response indicators that may be applicable to graph responses are illustrated in FIG. 2a. Such indicators may, for example, include one or more of lines/line lengths 213, end points 213a-b, slopes 213c, intersect 213b, and so on. Allowable deviation from such base indicators may, for example, include limited fixed or variable standard deviation from such indicators, alternative correct responses (e.g., to a CCR item having different correct responses), responses within a bounding region (e.g., 212), and so on, as is discussed in greater detail below. Exemplary base response indicators that may be applicable to markup responses are illustrated in FIGS. 3a through 3c, and may, for example, include clear selecting or crossing out of correct sub-items in a manner charged by a corresponding item (e.g., using one or more of corresponding circling, an X, strike through, and so on). Exemplary base response indicators that may be applicable to matching responses are shown in FIG. 4 and may, for example, include clear and concise or other linking of related items in a manner charged by a corresponding item (e.g., using one or more of corresponding circling, lines, direct connection, and so on). Exemplary base response indicators that may be applicable to short answer responses are shown in FIG. 5 and may, for example, include applicable content, spelling, grammar, punctuation, formation of letters, numbers and symbols, and so on.

Mixed or "crossover" responses may also be subject to base response indicators or allowable deviation. For example, the crossover response example of FIG. 5a corresponds with both a matching response and a short answer response, e.g., due to the task of matching sub-items in column-B with corresponding sub-items in column-A as well as a task of expressing the correspondence by entering a numeric response in the space provided in column-A. Exemplary base response indicators that may be applicable may, for example, include one or more of identifying a correct correspondence and using a correct numeric response to express the correspondence, as charged by the call of the item. The crossover response example of FIG. 5b corresponds with both a markup response and a short answer response, e.g., due to the identification of applicable words or phrases by way of markup, as well as the entry of correcting annotations or "corrections". FIG. 5b may also assess execution skills, for example, by implying from the format of the paragraph that short answer response annotations should be entered above applicable sub-items that the student has identified as incorrect. Exemplary base response indicators that may be applicable may, for example, include one or more of selecting each of the incorrect words and punctuation, striking out such words and punctuation as needed and providing the corresponding correct word portion in the charged locations in the manner charged by the call of the item (e.g., cross out symbol through the complete incorrect word or symbol only, entry of complete or partial replacement or addition, and so on).

It should be noted that the above criteria for which correspondence may yield a correct or incorrect response assessment is given by way of example only and is not intended to be limiting. Other criteria or some combination may also be used, for example, in conjunction with a particular item or item type. Item/response types may also be re-defined in accordance with a particular implementation. Some portion including all or less than all criteria may be assessed and full or partial raw or scaled credit may be provided in conjunction with one or more of initial or recursive: performance assessment, learning assessment or other assessment that may be conducted in accordance with one or more a particular fixed, criteria-driven or operational parameter driven embodiment. Additionally, embodiments of the present invention enable less than complete basis-matching or responses to be assessed in conjunction with one or more assessments that may be conducted.

(It will also become apparent that various singular, redundant or recursive assessments may be conducted in an automatic, manual or user assisted manner that may further include automatic flagging of assessment to be conducted in a manual or user assisted manner or for which further assessment of various types may be conducted for one or more of complete assessments of one or more types, undetermined, unclear, clustered or other item portions, of one or more students, and so on.)

Embodiments of the present invention further enable flexible assessment of responses that may deviate from an absolutely correct response. Deviating responses may but need not be assessed as incorrect. Assessment of deviation may, for example, be conducted in accordance with CCR evaluator 116 of FIG. 1 automatic or user assisted operation. Such operation may, for example, include determining a standard or other predetermined deviation from an absolutely correct response. Such deviation may, for example, include but is not limited to CCR evaluator 116 determining a percentage, deviation measure or other formulaic deviation (e.g. applicable as a function of pictorial or semantic attributes of an item type or a current item portion, or further, an item portion or assessment level/type assignable to an assessment subject), cluster or other post assessment analysis, and so on, or some combination thereof.

In a more specific embodiment, deviation may further be determined by CCR evaluator 116 according to deviation learning parameters that may be provided by one or more of assessment provider 101, other test generators, testing authorities, and so on (e.g., as was already discussed). Such parameters may, for example, define allowable deviation according to criteria such as those already discussed, or may augment other deviation determining mechanisms, e.g., by modifying operation of such mechanisms or deviations produced using such mechanisms.

Deviation that is implementable by CCR evaluator 116 is not, however, limited to a fixed deviation and may include variable deviation that may vary according to item, item group, item attribute or item attribute group specific or combined criteria. Graph 201 of FIG. 2a, for example, illustrates a static allowable deviation boundary 212 that may be applicable to base graph response 213. Boundary 212 is wholly static, since the same percentage or other determined deviation measure is applicable to the entirety of graph response 213 (i.e., or to all of a start point, end point, slope, length and other determinable attributes of graph response 213, as well as to instruction execution or other attributes that a corresponding item may be designed to assess or unintentionally assess in addition to that of charging a student with producing graph response 213). Static deviation may also be similarly applicable to one or more other CCR item type or other item type or even specific item portion attributes or to particular versions thereof (e.g., where more than one assessment version is applied in a concurrent or otherwise related manner).

CCR evaluator 116, however, also provide for determining variable allowable or disallowable) deviation that may vary in magnitude, direction or other aspects within a graph (variable deviation 222a-e), or for which different values may be applied separably to one or more graph segments 222c, 222e. In a more specific embodiment, variable learning deviation criteria or operating parameters may be received by CCR evaluator 116 according to which CCR evaluator 116 may determine variable deviation, in a similar manner as with static deviation. Other examples or combinations thereof will also become apparent to those skilled in the related art.

CCR evaluator 116 further provides for determining varying levels, degrees, or other granularities of allowable or disallowable deviation, for example, according to the above non-criteria mechanisms, deviation learning criteria, operational parameters, cluster or other post-assessment analysis or some combination. (It will be appreciated that cluster or other post-assessment analysis may be conducted on any suitable assessment data that is producible by substantially any assessment portion of one or more assessments. Such variable granularity, allowable or disallowable deviation may, for example, include but is not limited to substantial correctness, substantial incorrectness, incorrectness, incompletely determined or determinable correctness/incorrectness ("undeterminateness") or one or more sub-categories thereof. Variable granularity deviation learning criteria ("variable learning criteria") may be used in conjunction with performance, learning or other assessment.

Variable learning criteria may also be associated with one or more of particular item types, item portions or item portion attributes, deviations, errors, and so on, and may further be associated with one or more of type identifiers, e.g., including identifiers identifying the criteria type or criteria sub-category type, utilization identifiers, e.g., including identifiers identifying use request, use authorization, assessment utilization title, time or date, or other information in accordance with the requirements of a particular implementation. One or more of type or other identifiers may further be associated by CCR evaluator 116 to a particular response evaluation or assessment instance or group of instances (e.g., associating such identifier(s) with a below discussed evaluation indicator corresponding to evaluation of a response attribute or other portion. Other associate-able indicators may, for example, include one or more of item identifiers, item goal identifiers, student, teacher, facility or related identifiers, deviation type identifiers, deviation error type identifiers, grouping identifiers (e.g., where grouping of errors or deviations is implemented), other identifiers or some combination thereof.

A substantial correctness learning criteria provides, in one embodiment, for assessing the substantiality of correctness ("substantial correctness") of a CCR portion, or further, for determining scoring, learning or other criteria in accordance therewith. A correspondence of a CCR portion with substantial correctness criteria may, for example, indicate one or more of learning or execution deficiencies that may have led a student to provide a response portion that, while semantically or otherwise correct according to an allowable deviation, is determined to be not wholly correct or incorporate some error or other deficiency.

Such deficiencies may, for example include one or more of sloppiness or other infirmity, such as poor drawing ability or rushing (e.g., extra-deviation curved portion 233a of FIG. 2c), wasted time (e.g., erased segment 243 of FIG. 2d), limited time (e.g., plotted points with blank line portion 263b of FIG. 2f), and so on. Lack of knowledge, understanding of the graphic item, calculation error, and so on or some combination thereof may also be indicated according to substantial correctness or incorrectness criteria, e.g., reversal of a mathematical expression leading to a graph that conflicts with substantial correctness indicator 252 but correct plotting of the derived result 253 indicated by substantial incorrectness indicator 254 in FIG. 2e. (Substantial incorrectness is discussed in greater detail below.)

A performance assessment that includes substantial correctness assessment or some sub-category thereof (e.g., according to deviation learning criteria or operational parameters) may therefore bestow one or more of partial credit or a credited value in one embodiment for a response portion or response aspect portion that is determined to be substantially correct, or for an item goal or portion thereof, and so on, that is nevertheless achieved. A learning assessment may further utilize one or more of credit, partial credit or occurrence based indicators in conjunction with a response portion, response aspect portion or item goal or portion thereof, and so on, that is determined to be substantially correct. (In other embodiments, determinable causes or associated learning traits, or one or more of the above criteria, sub-criteria, identifier or other indicators may also be associated with a sub-stantially correct assessment.) Other examples or combinations thereof will also become apparent to those skilled in the related art.

Substantial incorrectness criteria provides, in one embodiment, for assessing the substantiality of incorrectness ("substantial incorrectness") of a CCR portion, or further, for determining scoring, learning or other criteria in accordance therewith. A correspondence of a CCR item response portion with substantial incorrectness criteria may, for example, indicate one or more of learning or execution deficiencies that may have led a student to provide a substantially incorrect graphic response portion.

Figure 2D:
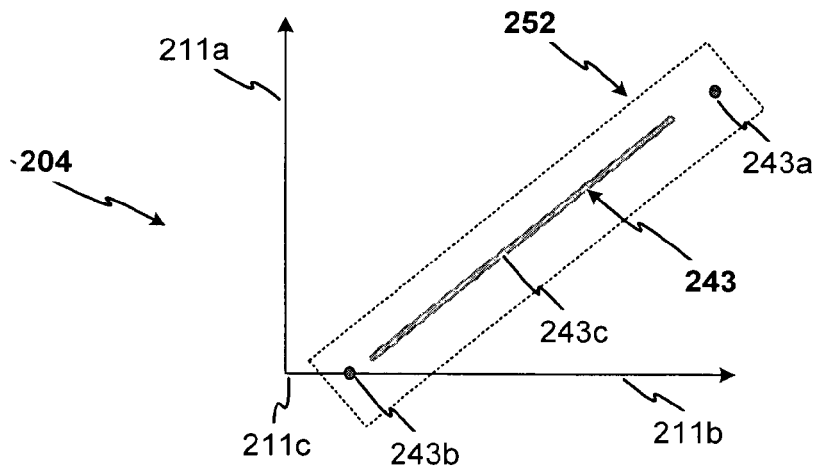
FIG. 2d is a graph illustrating further automated graph creation and evaluation that may be conducted by the systems of FIG. 1a or 1b in conjunction with automated CCR assessment, according to an embodiment of the invention.

FIG. 2d further illustrates how the substantiality of a student response may be determined and the results of that determination may be used to determine whether student markings are present, and if so, which if any of the student markings should be included in one or more evaluations or assessments that may be conducted. Substantiality of particular markings that are determined to exist may, for example, include blank responses (or "no response"), erasures or other unresponsiveness. In the case of erasure, the response may, for example, be ignored for purposes of performance evaluation or assessment and utilized in conjunction with learning evaluation or assessment. Alternatively, discernible substantive content corresponding to an erasure may be ignored in favor of a non-erased substantive response, included for performance evaluation or assessment, included for performance evaluation or assessment if no replacement response portion is provided, included for recursive performance evaluation or assessment only, or other utilization or utilization combination may be used in accordance with the requirements of a particular implementation.

Figure 2E:
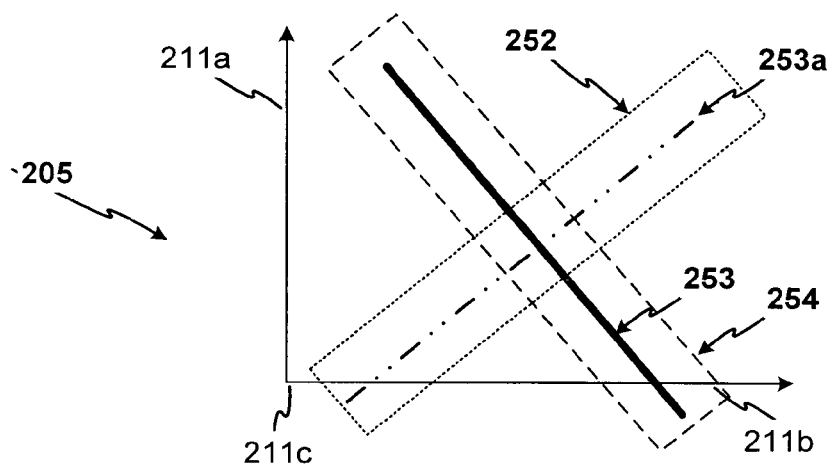
FIG. 2e is a graph illustrating further automated graph creation and evaluation that may be conducted by the systems of FIG. 1a or 1b in conjunction with automated CCR assessment, according to an embodiment of the invention.
Figure 2F:
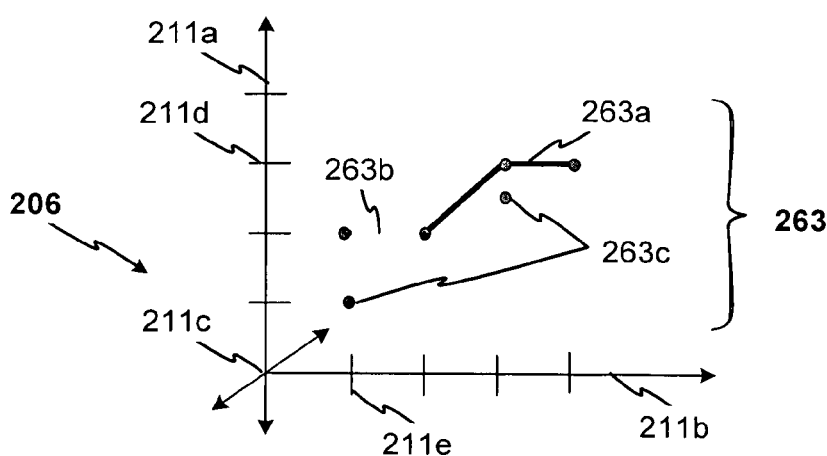
FIG. 2f is a graph illustrating further automated graph creation and evaluation that may be conducted by the systems of FIG. 1a or 1b in conjunction with automated CCR assessment, according to an embodiment of the invention.

In graph 205 of FIG. 2e, for example, a anticipate-able miscalculation of response segment 253 may or may not be so substantial, in accordance with assessment goals, as to result in assessment as a wholly incorrect response. Contrastingly, FIG. 2f includes a correct graph response portion 253a as well as a substantially incorrect graph response portion 253 (consistent with the reversal of a mathematical operator in a manner that may be anticipated or discovered via post-assessment cluster or other analysis). An unresponsive or incorrect graph response portion (e.g., not corresponding with correctness, substantial correctness or substantial incorrectness criteria or being found to be incorrect according to such criteria or incorrectness criteria), such as with extraneous points 263c of FIG. 2f, provides a further contrasting example of an incorrect response portion.

A performance assessment that includes substantial incorrectness assessment or some sub-category thereof (e.g., according to deviation learning criteria or operational parameters) may therefore bestow one or more of partial negative credit or a negatively credited value in one embodiment for a response portion or response aspect portion that is determined to be substantially incorrect, or for an item goal or portion thereof, and so on, corresponds to substantial incorrectness criteria. A learning assessment may further utilize one or more of negative credit, partial credit or occurrence based indicators in conjunction with a response portion, response aspect portion (e.g., target measurement) or item goal or portion thereof, and so on, that is determined to be substantially incorrect. (in other embodiments, determinable causes or associated learning traits, or one or more of the above criteria, sub-criteria, identifier or other indicators may also be associated with/a substantially incorrect assessment.) Other examples or combinations thereof will also become apparent to those skilled in the related art.

While in one embodiment, substantially incorrect CCR item responses may be assessed for grading purposes (e.g., see above), a more typical embodiment may limit such assessment (e.g., according to operational parameters) to determining further learning corresponding to such incorrectness or as a basis for further consideration or discussion.

Incorrectness criteria provides, in one embodiment, for assessing the incorrectness of a CCR portion, or further, for determining scoring, learning or other criteria in accordance therewith. A correspondence of a CCR item response with incorrectness criteria, a non-correspondence with of a CCR item response portion with sufficiently correct assessment using substantial correctness criteria or a sufficiently incorrect assessment using incorrectness criteria may, for example, result in an incorrect response (i.e., or level or other quality of incorrect response).

As with other assessment, incorrectness criteria may further have associated therewith type, sub-type or other indicators that may enable one or more instances or instance portions corresponding to criteria indicating incorrectness to be better identified as to known or discovered type description, known or discovered type label (e.g., known types or default types, for example, where discovered or otherwise not predetermined), other information or some combination thereof. Such association may, for example, be conducted by associating such indicators to corresponding ones of evaluation indicator, as was noted earlier.

Indeterminable correctness criteria provides, in one embodiment, for assessing responsive markings that do not correspond with correctness, substantial correctness, substantial incorrectness or incorrectness criteria (e.g., including any stray marks, erasure, no response, and so on). In a more specific embodiment, an indiscriminately incorrect (incorrect) response that fails to correspond with other (substantial) correctness or incorrectness criteria may be flagged for further review by a subject assessment system 112 user. As with other format/assessment criteria, specific mechanisms may vary in accordance with the requirements of a particular implementation.

FIGS. 3a through 6b illustrate further examples in which variable learning criteria may be applied to assessments of various CCR item response portions according to various embodiments of the present invention. All or some of the examples may be implemented in a more less integrated or distributed manner in accordance with a particular embodiment.

Markup response 300a of FIG. 3a, for example, illustrates three selection response portions 301a through 301c and three strikeout response portions 302a through 302c. In one embodiment, CCR evaluator 116 is configurable (via received operating parameters) such that CCR response portions that are evaluated as corresponding to correctness criteria are not further evaluated according to substantial correctness, substantial incorrectness, incorrectness or indeterminable correctness criteria. Thus, because each of response portions 301a-c corresponds with a charged response of circling matching items within a response region and each of response portions 302a-c corresponds with a charged response of drawing an "X" through unmatched sub-items portions, each of the response portions may be evaluated as correct. In a more specific embodiment, CCR evaluator 116 may generate evaluation indicators corresponding with such evaluation and may associate with the one or more evaluation indicators, corresponding item (portion) identification, utilization, type or other indicators. In other embodiments, however, CCR evaluator 116 may nevertheless conduct substantial correctness, substantial incorrectness and incorrectness evaluation to determine whether other student markings may be included for purposes of learning evaluation (e.g., following instructions to provide only the charged responses, time management or other indications due to erasure, and so on.

Markup response 300b of FIG. 3b illustrates a further example that includes responses that are "more likely" to be evaluated as deviating from a base correct response. (Note that the illustrated embodiment corresponds with a CCR evaluator that enables an assessment creation system/user, authority or other authorized individuals to determine, via operational parameters, those deviation learning criteria that may be evaluated, and if so, the nature of scoring, scaling, normalizing or otherwise assessing evaluations of response portions according to the criteria. The present embodiment also enables the refinement of such criteria, for example, so that a less substantially correct response may or may not be considered correct, a less substantially incorrect response may or may not be considered incorrect, correctness/incorrectness weighting may be applied to scoring or other assessment, associations may be more or less expansive if included, and so on. Assuming such parameters have been determined and are not modified via cluster, other post assessment analysis, and so on, then the likelihood of the following evaluation description may become a repeatable objective certainty.)

In evaluating markup response example 311, CCR evaluator 116 may determine that response portions 312, 318-319, 320, 322 and 325 correspond with base or standard deviation correctness requires by clearly circling nouns and thus correctly answering the call of the corresponding item. Response portion 311, however, may be determined to deviate from the base deviation criteria by failing to completely circle "time". However, in applying substantial correctness criteria (or mere "sloppiness", "failure to completely circle" or some other assessment system user definable sub-category thereof), a correspondence may be found whereby response portion 311 may be evaluated as sufficiently more correct than not to be evaluated as substantially correct. Alternatively, a degree of deviation for base correctness may instead apply such that the response may be evaluated as correct. Similar evaluations may be conducted with respect to response portions 313, 315, 316 and 324. (Scoring or other evaluation or post evaluation processing of such portions may also be conducted, for example, as was already discussed.)

While the overlap of response portion 321 with response portion 318 will likely be considered irrelevant, response portion 321 partially includes "one" as well as the correct response "day". However, because "day" is completely circled and "One" is only minimally circled, response portion 321 is more correct than not and will likely be evaluated as substantially correct. (Full credit will also likely be given in conjunction with a performance assessment of portion 321.) The remaining response portion 317 is less correct than portion 321 because both of "large" and "hill" are more similarly partially circled. However, response portion 321 appears less incorrect than correct. It is therefore less clear whether CCR evaluator 116 may be configured to consider the response substantially correct (or some sub-category thereof, for example, indicating that test taking, execution or time management skills may nevertheless require further training) or substantially incorrect (e.g., indicating a stronger or more urgent need).

Example 300c (FIG. 3c) illustrates a further contrasting example of a deviation having substantially correct aspects. More specifically, the student of example 300c has demonstrated a clear understanding of the skill being assessed according to the call of item 330 (identifying nouns) and has actually demonstrated super skill in its application. However, the student has failed to follow the directions provided and, instead of circling the nouns, has crossed out all but the nouns in response portion 300c. Therefore, unless the evaluation authority seeks a particularly strict assessment or the unlikely event that identifying nouns is of only minor importance (e.g., as a graduate-level education class evaluation), response portion 300c—while not "correct" according to some baseline—is clearly more correct than not. Such error may further be predetermined or later discovered (e.g., via static or variable super-region detection and cluster analysis), and will likely be evaluated as substantially correct. The student error may, however, result in an assessment of less than full credit in conjunction with performance assessment (depending upon the assessment configuration) and, in conjunction with learning assessment, resulting substantial correctness indicators may indicate that instruction following or other training is indicated.

The matching response example 400 of FIG. 4 provides an even clearer example of response portions that may be evaluated by CCR evaluator 116 as at least substantially correct. Such an evaluation, however, depends on whether CCR evaluator 116 is configured to detect responses within response region 161 or super-response region 162 and whether substantial correctness criteria is applicable to evaluation of a response corresponding to the present item portion. If, for example, only response region 161 is considered, then response portion 163 may be considered substantially correct, while response portion 164 may be considered incorrect. If instead, super-response region 162 is evaluated, then both of response portions 163 and 164 may be considered substantially correct. (Scoring or learning assessment results will again depend upon a configuration of operational parameters and deviation learning criteria, for example, as was already discussed.)

In the short answer response example 500 of FIG. 5, we will presume that each of short answer response portions 501-503 correctly reflects content that is provided and charged to be entered as responses by a corresponding short answer item. Therefore, whether the response portions are correct or less than correct will depend on a current configuration of operational parameters, deviation learning criteria or both that correspond to the present response. First, the deviation learning criteria may include a correctness list (i.e. or other suitable data structure) including alternative keywords, phrases, and so on that are to be evaluated as correct. Thus, for example, the correctness of response portions 501-503 with respect to content need not be diminished by other first presented or otherwise more prevalent correct responses, and a correctness indicator may be provided corresponding to a content aspect of the response portion.

The goals of learning item portions may, however, also include other short response aspects, such as grammar, punctuation, order, clarity of expression, letter formation, word spacing, and so on, or some combination. The deviation learning criteria utilized may also include character recognition (e.g., for determining inconsistent letter sizing, orientation, inversion or other formation aspects), spell checking using intended or expected meaning criteria, suitable diagnostic rules or expert rules, and so on. Thus, for example, such evaluation may indicate one or more of an incorrect ordering of responses (e.g., getting wet occurred first), incorrect capitalization of "Losing", a missing comma after "oar", and the incorrect use of "got". In such cases, a more heavily weighted evaluation of content may provide a correct evaluation for content, a substantially correct evaluation for ordering, and so on. Substantial incorrectness evaluations may also result for "got wet" or other aspects (e.g., where response portion aspects are separately evaluated), and so on. Such evaluation may, for example, yield a substantially correct overall related performance assessment scoring while also providing for consideration of particular aspect learning needs of a student in conjunction with a learning assessment, or further providing for more effective scoring or (re-)assessment in conjunction with expected or discovered clusters.

FIGS. 6a and 6b further illustrate how mixed responses may be more effectively evaluated in conjunction with deviation criteria, such as correctness, substantial correctness, substantial incorrectness, incorrectness and undetermined. For example, each of the short answer response portions for mixed matching response example 600a are substantively correct. The number formation errors made may also be considered insubstantial for a younger child or other person having a lower learning level, but substantial for an adult or more highly educated student. Therefore, depending on the configuration of deviation learning criteria, CCR evaluator 116 may determine, for a performance assessment, that a young child/low learning student response as depicted is correct and, for a learning assessment, that learning is required with respect to letter formation as expected. A similarly configured CCR evaluator may also determine, for a performance assessment, that an adult/educated student response as depicted is substantially correct (or some sub-category or level thereof) or even substantially incorrect (or some category or level thereof), and for learning assessment, that the student has a serious learning deficit.

The exemplary mixed markup and short answer response of FIG. 6b illustrates further examples of detectable deviations that may be more accurately assessed according to embodiments of the present invention. For example, while the strikeout of "lives" incorrectly includes the "i" of "in", CCR evaluator 116 may determine, for a performance assessment, that the response portion is more correct than incorrect and some level or category of substantial correctness may properly result, while the incorrectness may further be flagged in conjunction with a learning assessment. (There is, for example, no need to lose the ability to assess execution by limiting the cross out to one word, or to lose the ability to conduct more accurate learning assessment, or further, at a suitable level, personalization, demographics, and so on. Additionally, the addition of a comma of response portion 601 or replacement of "She" with "Sylvia" may further have not been anticipated by a test creator and, while otherwise correct (or not substantially incorrect) may therefore have been erroneously assessed as incorrect by conventional testing mechanisms. However, CCR evaluator 116 may automatically (or with user assistance) recognize a sufficient or sufficiently large population of responses in conducting post-assessment cluster analysis. CCR evaluator 116 may also automatically (or with user assistance) apply rule based or other checking mechanisms and determine that response portions 601 and 603 are both correct. CCR evaluator 116 may further conduct re-assessment as a result-oriented assessment or projection, or further, provide flags or alerts corresponding to such results.

CCR response evaluator 116 includes CCR item/response analyzer ("CCR analyzer") 116a, assessment engine 116b and assessment scoring and logging ("logging engine") 116c. CCR analyzer 116a provides for receiving a CCR response portion and determining therefrom a student's CCR response. CCR analyzer 116a in a more specific embodiment further receives, in addition to a CCR response portion, CCR item format criteria, for example, as was already discussed. CCR analyzer 116a compares the format criteria with the received electronic image, determines a suitably formatted portion of a current CCR item response that was provided by a corresponding student (e.g., a "student response" or blank), and provides the suitably formatted student response to CCR assessment engine 116b. CCR analyzer 116a may, for example, provide for registering/sizing or otherwise processing the image to a suitable format for conducting assessment. In another embodiment, CCR analyzer 116a determines registration/sizing and provides corresponding layout indicators to graphic assessment engine 116b. Other mechanisms or some combination of mechanisms may also be used in accordance with the requirements of a particular implementation.

CCR assessment engine 116b provides for assessing a received student response. In a more specific embodiment, CCR assessment engine 116b also receives, in addition to a student response, assessment criteria, for example, as was already discussed, as well as operational parameters. The operational parameters may, for example, indicate a particular algorithm or other mechanism for applying the assessment criteria to the student response in accordance with one or more of the above or other assessment alternatives, in accordance with the requirements of a particular implementation. In one embodiment, CCR assessment engine 116b compares the student response with the assessment criteria in accordance with the operational parameters (e.g., as was already discussed) and produces therefrom assessment indicators, which CCR assessment engine 116b provides to action/log engine 116c.

Assessment action/log engine ("log engine") 116c provides for analyzing received assessment indicators and for determining therefrom various actions that may be taken, as well as which operation may also be conducted in accordance with operational parameters (e.g., thereby enabling a degree of flexibility). As was already discussed, log engine 116c may provide for determining a raw or modified score corresponding to the assessment of the CCR response provided by the assessment indicators. Log engine 116 may also provide for comparing the assessment indicators with a learning map or other diagnostic criteria, and for determining therefrom one or more of actual/potential learning deficiencies, further learning, learning materials, discussion or other actions that may taken with regard to a corresponding student.

In a further embodiment, log engine 116c provides for conducting post assessment processing, for example, cluster detection/analysis. Cluster analysis may, for example, include log engine 116c analyzing one or more of evaluation indicators and assessment results corresponding to (related) response portions of one or more students. Log engine 116c may further conduct such analysis in accordance with corresponding item information that is ascertainable from item criteria or evaluation criteria that may be received from assessment engine 116b or test generation system 113 (i.e. or other test item information source) respectively. Clusters or cluster analyses may, for example, correspond with related response portions from different test versions, or items, responses, criteria, operating parameters or evaluation or assessment results corresponding to assessment of similar skills or exhibiting similar deviations.

Log engine 116c may, for example, determine from performance evaluation information clusters indicating a distribution of student scores. The distribution of scores may, for example, include a number of students receiving the same or similar scores for the same or corresponding response portions or may identify occurrences of different assessments for substantially the same response portion responses.

Log engine 116c may, for example, conduct cluster detection with respect to a raw student response, or evaluated or assessed performance or evaluated or assessed learning, or some combination thereof. Clusters may be identified (or detected) in one embodiment by processing raw response information. Raw response information may, for example, be determined using image processing techniques to group images (such as a scanned page or portion thereof to which the student responds), text strings (such as short or extended text responses), digital audio or sequence information, speech recognition, OCR, video, photographs, graphics, other multimedia, and so on, or some combination. The raw response image information may be compared, e.g., for image responses, to find common latent patterns that are similar (e.g., using techniques such as density of pixels on the image, placement of pixels, orientation or letters, inversion of letters, length of text strings, recurrence of words or shapes, numbers of words or shapes, commonality of edges detected, and so on, or some combination.

Log engine 116c may also conduct cluster detection on the basis of performance or learning evaluation or assessment indicators. Commonality of indicators or sets of indicators may, for example, be used to identify or otherwise find clusters. Clusters may be anticipated or modified by extension of anticipated clusters and may, for example, be used to improve the efficiency of automatic detection of latent clustering, among other purposes.

Comparison of raw student response derived clusters may be compared to clusters detected on the basis of performance or learning evaluation or assessment indicators to "guess" at the reason behind the clustering. Student demographic information, assessment condition (such as time of day, time of week, time of year, and so on) may also be used to infer semantic reasons for clustering. Human evaluation of clustering for expert opinion of causes of clustering may also be employed, either with or without automatic implication determination.

Log engine 116c may also provide for alerting a subject assessment system user that grading or other action(s) are uncertain, for example, due to an undetermined evaluation, or may otherwise require subject assessment system user review or other intervention. Log engine 116 may further return determined assessment results to other subject assessment system components or may store the assessment results for archival purposes, for use in assessing further graphic responses (e.g., see above AI utilization), for performing cluster analysis (i.e., or identification), or for other purposes in accordance with the requirements of a particular implementation.

The FIG. 1b flow diagram illustrates a further graphic item assessment system ("assessment system") 100b according to an embodiment of the invention. As shown, system 100b is operable in a similar manner as with system 100a of FIG. 1a. System 100b, however, additionally provides for conducting automatic or user-assisted assessment of test materials that may be provided in electronic, hard-copy, combined or mixed forms, or for returning assessment results to a test site, individual users, groups, and so on, or some combination in electronic, hard-copy, combined or mixed forms, among other features.

System 100b includes assessment provider system 101 and test site system 102, which systems are at least intermittently communicatingly couplable via network 103. As with system 100a, test materials may be generated by test generation system 113a, e.g., via a learning map or other diagnostic criteria, by hand, using other mechanisms or some combination, and delivered to test site 102a1 or other test sites in hard-copy form, for example, via conventional delivery. The test may further be administered in hard-copy form at various locations within one or more test sites and the responses or other materials may be delivered, for example, via conventional delivery to performance evaluation system 112a of assessment provider system 100a. In other embodiments, test materials, results or both may be deliverable in hard-copy, electronic, mixed or combined forms respectively via delivery service 104, network 103 or both. (It will be appreciated that administering of the assessment may also be conducted with respect to remotely located students, in accordance with the requirements of a particular implementation.

Substantially any devices that are capable of presenting testing materials and receiving student responses (e.g., devices 124, 125) may be used by students (or officiators) as testing devices for administering an assessment in electronic form. Network 103 may, for example, include a static or reconfigurable wired/wireless local area network (LAN), wide are network (WAN), such as the Internet, private network, and so on, or some combination. Firewall 118 is illustrative of a wide variety of security mechanisms, such as firewalls, encryption, fire zone, compression, secure connections, and so on, one or more of which may be used in conjunction with various system 100b components. Many such mechanisms are well known in the computer and networking arts and may be utilized in accordance with the requirements of a particular implementation.

As with system 100a, assessment provider 101 portion of assessment system 100b in one embodiment comprises a subject assessment system 112 including a test material receiving device 111 and a graphic response evaluator 116. Test material receiving device 111 may also again include a high-speed scanner, braille reader or other mechanism for receiving one or more response portions (e.g., of an answer book or mixed item-and-response format assessment sheet) and providing included item responses in an electronic format to other subject assessment system components. (It will be appreciated, however, that no conversion to electronic form may be required for responses or other utilized test materials that are received in electronic form.)

Subject assessment system 112a of the illustrated embodiment includes a CCR response evaluator 116 that provides for assessing one or more CCR item responses included in the electronically formatted test materials, and may be operable for receiving and operating in accordance with evaluation criteria. The evaluation criteria may also include a response format and deviation criteria for assessing a CCR response of one or more students according to a base CCR response, correctness, substantial correctness, substantial incorrectness, incorrectness or other criteria or some combination, in accordance with the requirements of a particular implementation. Such criteria may further be utilized in the illustrated embodiment in substantially the same manner as was already discussed, and CCR analyzer 116a, CCR assessment engine 116b and log engine 116c may be operable in substantially the same manner as was already discussed. Log engine 116c may further provide for returning determined assessment results to other subject assessment system components in hard-copy, electronic, mixed or combined forms, or may further provide for conducting cluster analysis or other post-assessment processing.

Figure 7:
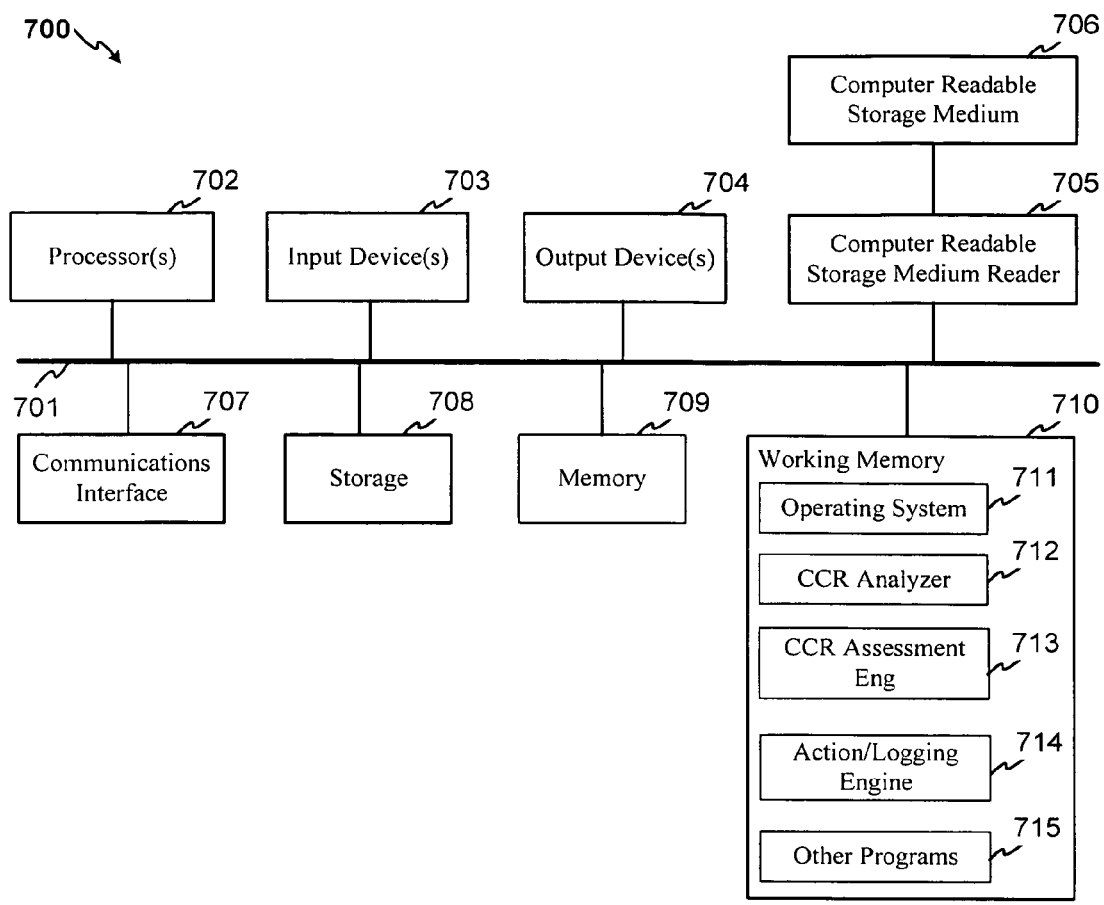
FIG. 7 is a schematic diagram illustrating an exemplary computing system including one or more of the monitoring enabled network system components of FIG. 1a or 1b, or for accomplishing the operations illustrated by FIGS. 2a through 6b, according to an embodiment of the invention.

The FIG. 7 flow diagram illustrates a computing system embodiment that may comprise one or more of the components of FIGS. 1a and 1b. While other alternatives may be utilized or some combination, it will be presumed for clarity sake that components of systems 100a and 100b and elsewhere herein are implemented in hardware, software or some combination by one or more computing systems consistent therewith, unless otherwise indicated or the context clearly indicates otherwise.

Computing system 700 comprises components coupled via one or more communication channels (e.g. bus 701) including one or more general or special purpose processors 702, such as a Pentium®, Centrino®, Power PC®, digital signal processor ("DSP"), and so on. System 700 components also include one or more input devices 703 (such as a mouse, keyboard, microphone, pen, and so on), and one or more output devices 704, such as a suitable display, speakers, actuators, and so on, in accordance with a particular application.

System 700 also includes a computer readable storage media reader 705 coupled to a computer readable storage medium 706, such as a storage/memory device or hard or removable storage/memory media; such devices or media are further indicated separately as storage 708 and memory 709, which may include hard disk variants, floppy/compact disk variants, digital versatile disk ("DVD") variants, smart cards, partially or fully hardened removable media, read only memory, random access memory, cache memory, and so on, in accordance with the requirements of a particular implementation. One or more suitable communication interfaces 707 may also be included, such as a modem, DSL, infrared, RF or other suitable transceiver, and so on for providing inter-device communication directly or via one or more suitable private or public networks or other components that can include but are not limited to those already discussed.

Working memory 710 further includes operating system ("OS") 711, and may include one or more of the remaining illustrated components in accordance with one or more of a particular device, examples provided herein for illustrative purposes, or the requirements of a particular application. CCR analyzer 712, CCR assessment engine 713 and action/logging engine 714 may, for example, be operable in substantially the same manner as was already discussed. Working memory of one or more devices may also include other program(s) 715, which may similarly be stored or loaded therein during use.

The particular OS may vary in accordance with a particular device, features or other aspects in accordance with a particular application, e.g., using Windows, WindowsCE, Mac, Linux, Unix, a proprietary OS, and so on. Various programming languages or other tools may also be utilized, such as those compatible with C variants (e.g., C++, C#), the Java 2 Platform, Enterprise Edition ("J2EE") or other programming languages. Such working memory components may, for example, include one or more of applications, add-ons, applets, servlets, custom software and so on for conducting but not limited to the examples discussed elsewhere herein. Other programs 715 may, for example, include one or more of security, compression, synchronization, backup systems, groupware, networking, or browsing code, and so on, including but not limited to those discussed elsewhere herein.

When implemented in software, one or more of system 100a and 100b or other components may be communicated transitionally or more persistently from local or remote storage to memory (SRAM, cache memory, etc.) for execution, or another suitable mechanism may be utilized, and one or more component portions may be implemented in compiled or interpretive form. Input, intermediate or resulting data or functional elements may further reside more transitionally or more persistently in a storage media, cache or other volatile or non-volatile memory, (e.g., storage device 708 or memory 709) in accordance with the requirements of a particular application.

Figure 8A:
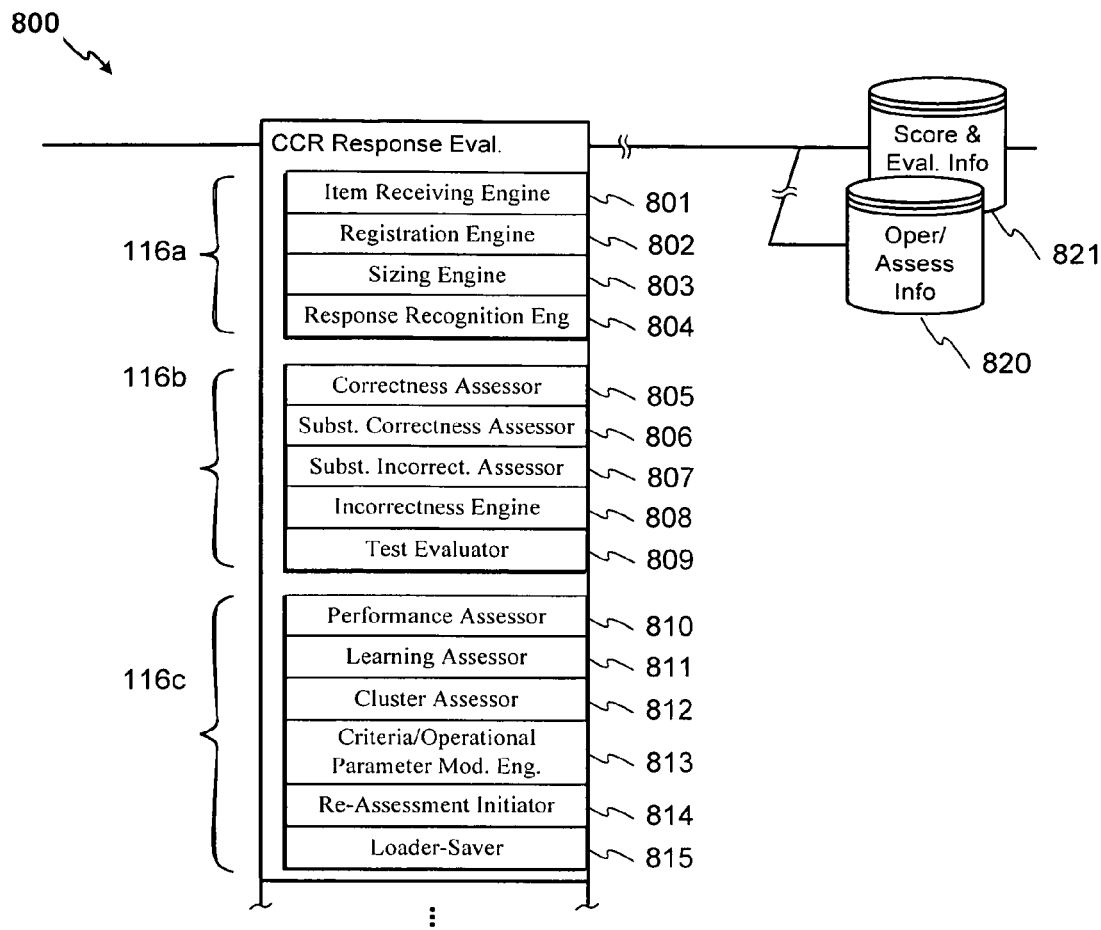
FIG. 8a is a schematic diagram illustrating the CCR response evaluator of FIG. 1 in greater detail, according to an embodiment of the invention.
Figure 8B:
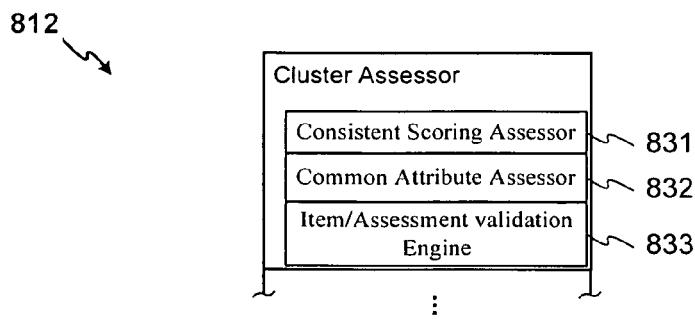
FIG. 8ba is a schematic diagram illustrating the cluster evaluator of FIG. 8a in greater detail, according to an embodiment of the invention.

The FIGS. 8A and 8B flow diagrams illustrates, in greater detail an example of CCR response evaluator 116 of FIGS. 1a and 1b, according to an embodiment of the invention. As shown in FIG. 8A, CCR response evaluator 800 includes CCR item receiving engine 801, registration engine 802, sizing engine 803, response recognition engine 804, correctness assessor 805, substantial correctness assessor 806, substantial incorrectness assessor 807, incorrectness engine 808, test evaluator 809, performance assessor 810, learning assessor 811, cluster assessor 812, criteria-parameter modifying engine 813, re-assessment initiator 814 and loader/saver 815. CCR response evaluator 800 also includes operational and assessment information storage 820 and evaluation information storage 821.

Item receiving engine 801 provides for receiving, from an assessment system component or storage 820, a current or prior CCR item or CCR item response. Item receiving engine 801 may, for example, receive a current graphic item for determining reference information in embodiments in which such information may be provided in testing materials rather than testing response materials and where graph format information is not otherwise provided. In such basic graphic or other CCR reference elements may be determined as being generally consistent with a provided CCR item, and may be located as substantially corresponding with such reference elements. A current CCR response may further be received for conducting assessment, or one or more prior CCR responses of the same or different students may be used for conducting AI-based or other test assessment, scoring, performance assessment or learning assessment (e.g., see below).

Registration engine 802 and sizing engine 803 provide for modifying a received item, response, and so on (or the manner of assessing a CCR response) as needed to conform to a reliable reference such that assessment of a graphic response (e.g., start, end, curve, thickness, slope, symbol, and so on) may be conducted in a reliable manner. Registration engine 802 provides for modifying registration of a CCR response while sizing engine 803 provides for modifying a size of a CCR response. Given a suitable reference model, e.g., as above, both may, for example, be conducted by way of adjustment of a CCR item response to conform to a known CCR reference.

Correctness assessor 805, substantial correctness assessor 806, substantial incorrectness assessor 807 and incorrectness engine 808 provide for comparing a CCR response with a baseline CCR response example or allowable deviation from such baseline graphic response or some other standard. As was discussed earlier, such comparison enables components 805 through 808 to determine not only absolute correctness, but also one or more of the substantiality of substantial correct or incorrect deviation from such correctness, the type, credit that may be given, actual/apparent cause(s), additional learning or learning materials, and so on. As a result, a more consistent, efficient, comprehensive or defensible assessment may be made or intervention by an assessment system user may be automatically requested.

Test evaluator 809 further provides for integrating results provided by components 805 through 808 to produce a graphic response score. Performance assessor 810 further provides for determining, e.g., by comparison with a list, rules or other collection of known performance assessment criteria, the types or substantiality of deficiencies indicated by a student response to a graphic item, while learning assessor 811 provides for comparing learning map or other diagnostic criteria and determining therefrom further learning, learning materials, discussion, and so on that may be applicable. Cluster assessor 812 provides for identifying clusters from one or more of the item, response, base or deviation criteria, evaluation indicators and assessment indicators, or further, for analyzing the clusters, for example, in accordance with the mechanisms discussed above.

Cluster assessor 812 or other CCR response evaluator components may further initiate criteria-parameter modification engine ("modification engine") 814, re-assessment initiator 814 or loader/saver 815 operation. Modification engine 814 provides for modifying current operational parameters in accordance with cluster analysis or other post-evaluation or post-assessment processing that may be conducted, and may further provide for initiating re-assessment initiator operation Re-assessment initiator 814 provides for initiating re-assessment of one or more response portions of one or more students, for example, in accordance with post-evaluation or post-assessment processing results, modification of operational parameters or assessment criteria, and so on, or some combination, automatically or in conjunction with CCR response evaluation system user intervention. Loader/saver 815 is operable responsive to other CCR response evaluation component initiation by storing or retrieving information to/from storage 820, 821. Storage 820 in one embodiment stores operational or assessment criteria according to which CCR response evaluator is operable, while storage 821 provides for storing scoring or other assessment information that may be determined by graphic response evaluator.

FIG. 8b further illustrates an embodiment of cluster assessor 812 in greater detail. As shown in FIG. 8b, cluster assessor 812 may include various components for performing cluster identification or other analysis that may be conducted. For example, consistent scoring assessor 831 provides for performing cluster analysis that may determine whether common scoring or other evaluation or assessment has been applied to a same student respecting different item response portions or among two or more different students respecting the same or different item response portions. Common attribute assessor 832 provides for determining cluster characteristics respecting the same, similar or related testing goals, the same, similar or different evaluation or assessment, and so on, in accordance with the requirements of a particular implementation. Item/assessment validation engine 833 provides for validating one or more evaluation or assessment results corresponding to one or more students in accordance with variable parameters. Such mechanisms may, for example, be operable in the manners already discussed.

Figure 9:
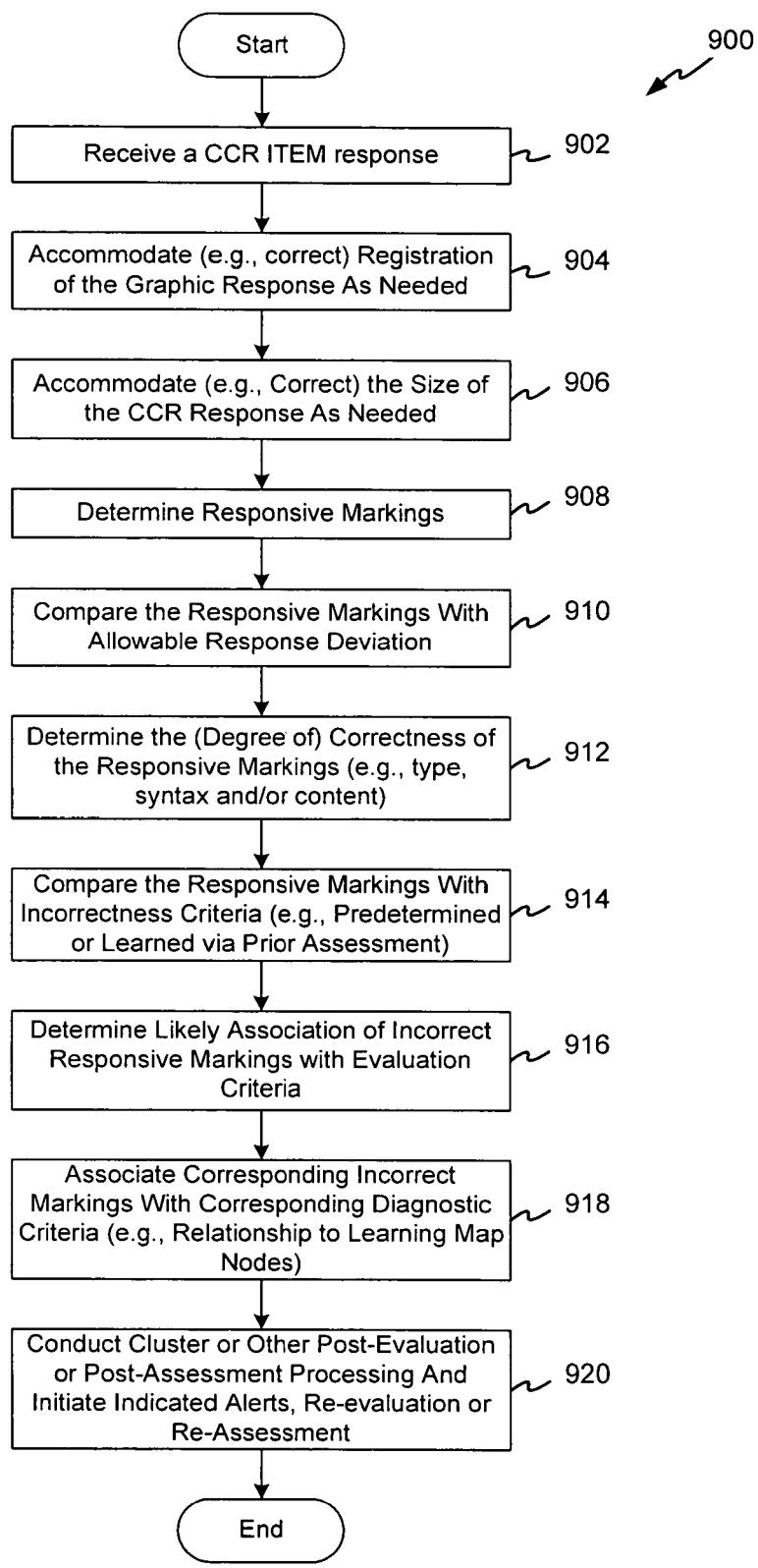
FIG. 9 is a flowchart illustrating a graphic response assessing method according to an embodiment of the invention.

Turning now to FIG. 9, a CCR response assessing method 900 is illustrated according to an embodiment of the invention that may, for example, be performed by a CCR response evaluator. In block 902, the evaluator receives a CCR item response to be assessed. In blocks 904 and 906, the evaluator accommodates registration and sizing of the CCR item response respectively as needed. Such accommodating in one embodiment may include receiving reference information for determining a target registration and sizing, and modifying the CCR item response to conform to such criteria. In another embodiment, assessment criteria or application of such criteria may be modified to conform to the reference. Another embodiment provides for analyzing the CCR item response and determining, e.g., according to conventional or other substantial axis alignment or graphic portion slope, extent or other determinable characteristic(s), or other CCR item/response attributes, an orientation and size according to which the CCR response, assessment criteria or assessment criteria application may be modified to provide substantial conformance.

In block 908, the evaluator determines responsive markings, for example, by removing markings that are not provided by a test subject. In block 910, the evaluator compares the responsive markings with allowable response deviation. Such comparison may, for example, be conducted with respect to a baseline CCR item response or sub-criteria associated therewith (e.g., standard deviation) or further allowable or other deviation criteria (e.g., substantial correctness/incorrectness, incorrectness, undetermined, and so on, or sub-criteria associated therewith. In block 912, the evaluator determines the correctness or substantial correctness of the responsive markings. Such comparison may, for example be conducted with respect to deviation type, syntax or content, and may be conducted in accordance with correctness or substantial correctness criteria, standard deviation, other CCR items of the same or different users, and so on, or some combination thereof.

A score may further be determined as corresponding to the correctness or substantial correctness. In block 914, the evaluator compares the responsive markings with incorrectness or substantial incorrectness criteria. Substantial incorrectness criteria may, for example, be supplied to or determined by the evaluator or an evaluator user as corresponding to errors that are more likely to be made by a test subject (e.g., reversing or otherwise hindering a mathematical expression, excluding information, providing only a partial graph or points, erasing, stray or incorrect markings, and so on or some combination thereof). Incorrectness in one embodiment may further be determined by a CCR response portion failing to correspond with correctness, substantial correctness or substantial incorrectness. In block 916, the evaluator determines a likely association of incorrect responsive markings with evaluation criteria (i.e., or sub-criteria associated therewith), for example, leaving the response area blank or substantively or otherwise substantially blank, incorrect type, and so on. The evaluator may, for example, provide for scoring or score adjustment, alerting an evaluator user, and so on, or some combination. In block 918, the evaluator associates corresponding incorrect or substantially incorrect markings with corresponding diagnostic criteria. Such comparison may, for example, include determining a relationship of the incorrect or substantially incorrect markings to one or more learning map nodes, such that additional learning, learning materials, other corrective or cautionary actions or some combination may be determined. In block 920, the evaluator conducts any cluster or other post-evaluation or post-assessment processing that may be indicated, in accordance with operational parameters, and so on, or some combination.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope of the present invention to implement a program or code that can be stored in a machine-readable medium to permit a computer to perform any of the methods described above.

Additionally, any signal arrows in the drawings/figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A computerized system for assessing electronically-provided constrained constructed responses, said system comprising:
 a computer with a memory storing constrained constructed response assessment program code executable by said computer to assess electronically-provided constrained constructed responses, said program code including a set of instructions defining a constrained constructed response analyzer, a constrained constructed response assessment engine, and a constrained constructed response action engine;

wherein said constrained constructed response analyzer includes a first subset of instructions executable by said computer to receive electronically-provided constrained constructed responses and to retrieve absolute correctness and deviation assessment criteria against which the electronically-provided constrained constructed responses can be compared;

wherein said constrained constructed response assessment engine includes a second subset of instructions executable by said computer to determine at least one evaluation indicator based upon a comparison by said assessment engine of the electronically-provided constrained constructed responses received by said analyzer and the absolute correctness and deviation assessment criteria retrieved by said analyzer;

wherein said constrained constructed response action engine includes a third subset of instructions executable by said computer to produce an assessment system output based on at least one evaluation indicator determined by said assessment engine; and wherein said constrained constructed response action engine further includes a subset of instructions executable by said computer to compare evaluation indicators from said constrained constructed response assessment engine with a learning map and to determine from said comparison at least one of learning deficiencies and opportunities for further learning.

2. The system of claim 1, wherein said evaluation indicator is selected by said constrained constructed response assessment engine from a group of indicators including correctness, substantiality of correctness, substantiality of incorrectness, and incorrectness indicators.

3. The system of claim 2, wherein said group of indicators further includes an indeterminate indicator.

4. The system of claim 2 wherein said constrained constructed response assessment engine is configured such that an evaluation indicator representing substantial correctness yields partial credit.

5. The system of claim 2, wherein said constrained constructed response assessment engine is configured such that an evaluation indicator representing substantial incorrectness yields partial credit.

6. The system of claim 2, wherein said constrained constructed response action engine is configured to determine respondent learning needs based on at least one of substantial correctness and substantial incorrectness of a response to a constrained constructed response item.

7. The system of claim 2, wherein said constrained constructed response action engine is configured to determine a grade based on at least one of substantial correctness and substantial incorrectness of a response to a constrained constructed response item.

8. The system of claim 1, wherein said assessment criteria include at least one of registration criteria, identification criteria, sizing criteria, item border criteria, response region criteria, response super-region criteria, response format criteria and base response criteria.

9. The system of claim 8, wherein said sizing criteria include indicators for reversing a size increase.

10. The system of claim 8, wherein said response region criteria describes an item response area in which a respondent is charged with providing a constrained constructed response.

11. The system of claim 8, wherein said response super-region criteria describe an item response area in which a response to a constrained constructed item may be found.

12. The system of claim 11, wherein said response super-region for a constrained constructed response item is larger than a response area called for by the constrained constructed response item.

13. The system of claim 12, wherein said response super-region corresponds with allowable errors in responding to the constrained constructed response item.

14. The system of claim 11, wherein said response super-region criteria applied by said system are variable.

15. The system of claim 11, wherein said constrained constructed response analyzer engine uses super-region criteria to determine more than one super-region for a single constrained constructed response item.

16. The system of claim 8, wherein said base response criteria for a constrained constructed response item consists of a single correctness criteria.

17. The system of claim 8, wherein said base response criteria for a constrained constructed response item includes a plurality of correctness criteria.

18. The computerized system according to claim 1, wherein the electronically-provided constrained constructed responses include at least one of a graphing item response, a markup item response, a matching item response, and a short answer response.

19. The system of claim 18, wherein said response format criteria include respondent marking detection facilitating parameters.

20. The system of claim 18, wherein said assessment criteria include both super-region criteria and response format criteria.

21. The system of claim 18, wherein only those assessment criteria corresponding to a current constrained constructed response item are transferred to said constrained constructed response analyzer.

22. The system of claim 1, further comprising at least one constrained constructed response reader.

23. The system of claim 22, wherein said constrained constructed response reader includes at least one of a scanner, a braille reader, and a digitizing tablet.

24. The system of claim 1, further comprising a printer.

25. The system of claim 24, wherein said program code further includes a set of instructions executable by said computer to generate an assessment report using said printer.

26. The system of claim 24, wherein said program code further includes a set of instructions executable by said computer to generate test materials using said printer.

27. The system of claim 1, wherein said constrained constructed response analyzer further includes a subset of instructions executable by said computer to retrieve format criteria from memory, compare said format criteria with an electronically-provided constrained constructed response, determine a suitably formatted portion of a constrained constructed response and provide a suitable formatted response to said constrained constructed response assessment engine.

28. The system of claim 27, wherein said constrained constructed response analyzer further includes a subset of instructions executable by said computer to reformat an electronically-provided constrained constructed response for assessment by said constrained constructed response assessment engine.

29. The system of claim 27, wherein said constrained constructed response analyzer further includes a subset of instructions executable by said computer to determine at least one of registration and sizing of an electronically-provided constrained constructed response and to provide a corresponding layout indicator to said constrained constructed response assessment engine.

30. The system of claim 1, wherein said constrained constructed response action engine further includes a subset of instructions executable by said computer to perform cluster analysis of constrained constructed responses from multiple respondents.

31. The system of claim 30, wherein said cluster analysis is performed by said computer using raw constrained constructed response information from multiple respondents.

32. The system of claim 30, wherein said cluster analysis includes image processing constrained constructed responses from multiple respondents.

33. The system of claim 32, wherein said image processing of constrained constructed responses includes finding common latent patterns that are similar among multiple respondents.

34. The system of claim 30, wherein said cluster analysis is performed using evaluation indicators for multiple respondents.

35. The system of claim 34, wherein clusters detected on the basis of raw constrained constructed response information are compared with clusters detected on the basis of evaluation indicators.

36. The system of claim 30, further comprising a set of instructions executable by said computer to modify evaluation criteria based on identification of clusters.

37. The system of claim 36, further comprising a set of instructions executable by said computer to initiate reassessment of a constrained constructed response by said constrained constructed response assessment engine using said modified evaluation criteria.

38. The system of claim 1, wherein said action engine saves assessment results in said memory.

39. The system of claim 1, wherein said computer is at least intermittently communicatingly coupleable with an assessment provider system via a network.

40. The system of claim 39 above, wherein said assessment provider system is configured to deliver constrained constructed response items electronically to remote readers via said network, and wherein said readers are configured to accept constrained constructed responses from respondents and transmit said constrained constructed responses to said system.

41. A computerized method for assessing electronically provided constrained constructed responses, said method comprising the steps of:
using a computer to receive an item response portion corresponding to an assessment item, wherein the item response portion has a response region and the assessment item has an associated constrained constructed response item type;
using a constrained constructed response analyzer of the computer to isolate at least a part of the responsive markings within a super-response region corresponding to the response region;
using a constrained constructed response assessment engine of the computer to compare the responsive markings to absolute correctness and deviation assessment criteria and using the comparison to select an evaluation indicator from a group of indicators including correctness, substantiality of correctness, incorrectness and substantiality of incorrectness of the responsive marking;
using a constrained constructed response action engine to determine at least one of performance assessment and learning assessment based on the evaluation indicator selected;
determining a learning deficiency from the evaluation indicator of at least one item; and
determining a relationship of a learning deficiency to a learning map.

42. The method of claim 41, further comprising the step of conducting a recursive assessment in which at least one of the evaluation indicators and the assessment parameters are compared.

43. The method of claim 42, wherein said step of conducting a recursive assessment includes comparing the evaluation indicators of a same assessment subject and determining therefrom clusters of errors of the same type.

44. The method of claim 42, further comprising the step of associating at least one of the deviation assessment criteria of a subtype thereof a deviation type indicator of one of a definite and an indefinite type.

45. The method of claim 42, further comprising at least one of the steps of regrading and ignoring an item on the basis of said step of conducting a recursive assessment.

46. The method of claim 43, further comprising the step of evaluating an item based on the size of clusters.

47. The method of claim 43, further comprising the steps of comparing cluster sizes and determining optimal forms of selected response items that target sub-populations of subjects.

48. The method of claim 41, further comprising the step of comparing the evaluation indicators of different assessment subjects and determining therefrom clusters of errors of a same type.

49. The method of claim 48, further comprising at least one of the steps of regrading and ignoring an item on the basis of said step of conducting a recursive assessment.

50. The method of claim 48, further comprising the step of evaluating an item based on the size of clusters.

51. The method of claim 48, further comprising the step of comparing cluster sizes and determining optimal forms of selected response items that target sub-populations of subjects.

52. The method of claim 48, further comprising the step of modifying evaluation criteria based on said recursive assessment.

53. The method of claim 52, further comprising the step of reassessing constrained constructed responses using said modified evaluation criteria to generate new evaluation indicators.

54. The method of claim 41, wherein the set of evaluation indicators that can be derived from said step of comparing the responsive markings to evaluation criteria includes an indicator that the responsive marking does not correspond with the evaluation criteria.

55. The method of claim 54, further comprising the step of manually reviewing a responsive marking if said comparing step results in a evaluation indicator that the responsive marking does not correspond with the evaluation criteria.

56. The method of claim 41, wherein constrained constructed response portions that are evaluated in said comparing step as corresponding to correctness criteria are not compared to substantial correctness, substantial incorrectness, or incorrectness criteria.

57. The method of claim 41, wherein constrained constructed response portions that are evaluated in said comparing step as corresponding to correctness criteria are further compared to substantial correctness, substantial incorrectness, and incorrectness criteria.

58. The method of claim 41, further comprising the step of assigning individual weights to respective evaluation criteria, and wherein said step of determining evaluation indicators uses the individual weights to determine the correctness, substantial correctness, substantial incorrectness, or incorrectness of the responsive marking.

59. The method of claim 41, wherein said step of determining evaluation indicators includes taking into account membership of the subject in a subpopulation.

* * * * *